United States Patent
Yu et al.

(10) Patent No.: US 11,422,703 B2
(45) Date of Patent: *Aug. 23, 2022

(54) DATA UPDATING TECHNOLOGY

(71) Applicant: HUAWEI TECHNOLOGIES CO., LTD., Guangdong (CN)

(72) Inventors: Qun Yu, Beijing (CN); Jun Xu, Nanjing (CN); Yuangang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/937,946

(22) Filed: Jul. 24, 2020

(65) Prior Publication Data

US 2020/0356270 A1 Nov. 12, 2020

Related U.S. Application Data

(63) Continuation of application No. 16/105,315, filed on Aug. 20, 2018, now Pat. No. 10,725,662, which is a
(Continued)

(30) Foreign Application Priority Data

Feb. 18, 2019 (WO) ................ PCT/CN2016/074059

(51) Int. Cl.
 *G06F 3/06* (2006.01)
 *G06F 12/08* (2016.01)
 *G06F 12/0868* (2016.01)

(52) U.S. Cl.
 CPC ................ *G06F 3/061* (2013.01); *G06F 3/06* (2013.01); *G06F 3/065* (2013.01); *G06F 3/067* (2013.01);
(Continued)

(58) Field of Classification Search
 CPC ...... G06F 3/061; G06F 3/0656; G06F 3/0689; G06F 3/0868; G06F 2212/1016;
(Continued)

(56) References Cited

U.S. PATENT DOCUMENTS 5,526,482 A ‡ 6/1996 Stallmo et al. ..... G06F 11/1076
5,835,940 A ‡ 11/1998 Yorimitsu ........... G06F 11/1076
 711/11
(Continued)

FOREIGN PATENT DOCUMENTS

CN 101763220 A ‡ 6/2010
CN 102053802 A ‡ 5/2011
(Continued)

OTHER PUBLICATIONS

Qing Yang et al, DCD—Disk Caching Disk: A New Approach for Boosting I/O Performance. 23rd Annual International Symposium on Computer Architecture (ISCA 96), Dec. 27, 2005, 10 pages.‡

(Continued)

*Primary Examiner* — Masud K Khan

(57) ABSTRACT

A storage system includes a management node and a plurality of storage nodes forming a redundant array of independent disks (RAID). When the management node determines that not all data in an entire stripe is updated based on a received write request, the management node sends update data chunk obtained from to-be-written data to corresponding storage node. The storage node do not directly update, based on the received update data chunks, data block stored in storage device of the storage node, but store the update data chunk into non-volatile memories (NVM) cache of the storage node and send the update data chunk to another storage node to backup. According to the data updating method, write amplification problems caused in a stripe
(Continued)

update process can be reduced, thereby improving update performance of the storage system.

20 Claims, 7 Drawing Sheets

Related U.S. Application Data continuation of application No. PCT/CN2017/073920, filed on Feb. 17, 2017.

(52) U.S. Cl.
CPC .......... G06F 3/0614 (2013.01); G06F 3/0656 (2013.01); G06F 3/0689 (2013.01); G06F 12/0868 (2013.01); G06F 2212/1016 (2013.01); G06F 2212/222 (2013.01); G06F 2212/281 (2013.01)

(58) Field of Classification Search
CPC ........ G06F 2212/222; G06F 2212/281; G06F 2211/1009; G06F 12/0868
See application file for complete search history.

(56) References Cited

U.S. PATENT DOCUMENTS

| | | | | |
|---|---|---|---|---|
| 6,230,240 | B1 ‡ | 5/2001 | Shrader | G06F 3/0607 |
| | | | | 710/30 |
| 2012/0173790 | A1* | 7/2012 | Hetzler | G06F 11/1076 |
| | | | | 711/103 |
| 2012/0271997 | A1 ‡ | 10/2012 | Galloway | G06F 11/1076 |
| | | | | 711/11 |
| 2014/0208062 | A1 ‡ | 7/2014 | Cohen | G06F 3/0688 |
| | | | | 711/20 |
| 2015/0253990 | A1 ‡ | 9/2015 | Yen | G06F 3/061 |
| | | | | 711/10 |
| 2016/0179410 | A1* | 6/2016 | Haas | G06F 12/0873 |
| | | | | 714/6.24 |
| 2016/0246516 | A1 ‡ | 8/2016 | Zhang | G06F 16/219 |
| 2017/0169233 | A1* | 6/2017 | Hsu | G06F 21/602 |

FOREIGN PATENT DOCUMENTS

| | | | | | |
|---|---|---|---|---|---|
| CN | 102291268 | A | ‡ | 12/2011 | |
| CN | 102662607 | A | ‡ | 9/2012 | |
| CN | 103049222 | A | ‡ | 4/2013 | |
| CN | 103558998 | A | ‡ | 2/2014 | .......... G06F 3/0607 |
| CN | 103942114 | A | ‡ | 7/2014 | ......... G06F 12/1009 |
| CN | 104881244 | A | ‡ | 9/2015 | |

OTHER PUBLICATIONS

Jai Menon et al, The Architecture of a Fault-Tolerant Cached RAID Controller. 1993 IEEE, 11 pages.‡

\* cited by examiner
‡ imported from a related application

DATA UPDATING TECHNOLOGY

CROSS-REFERENCE TO RELATED APPLICATIONS

This application is a continuation of U.S. patent application Ser. No. 16/105,315, filed on Aug. 20, 2018, which is a continuation of International Application No. PCT/CN2017/073920, filed on Feb. 17, 2017, which claims priority to International Application No. PCT/CN2016/074059, filed on Feb. 18, 2016. All of the aforementioned patent applications are hereby incorporated by reference in their entirety.

TECHNICAL FIELD

The present invention relates to the field of storage technologies, and in particular, to a data updating technology.

BACKGROUND

In a storage system, data reliability is usually ensured by using an erasure code (EC) coding technology. In the EC coding technology, a redundancy bit is added by encoding to-be-stored data. When a storage device becomes faulty, the redundancy bit is used to recover data in the faulty device. A redundant array of independent disks (RAID) is also referred to as a redundant array of inexpensive disks (RAID), and is referred to as a disk array for short. A principle of RAID is combining a plurality of relatively inexpensive hard disks into a hard disk array group, to make performance equivalent to or even better than that of an expensive huge-capacity hard disk. The RAID improves data security by using a design of scattered data arrangement. With development of RAID technologies, the EC coding technology is applied to the RAID technology, to continuously improve data security. For example, RAID 5, RAID 6, RAID 7, and the like are all RAID technologies implemented based on the EC coding technology.

In a storage system implemented based on a RAID technology, a plurality of data blocks together with parity data form a stripe in a RAID, and be separately written into a plurality of magnetic disks forming the RAID. Using the RAID technology, data can be stored into and read from the plurality of magnetic disks simultaneously, so that a data throughput of the storage system can be greatly increased. In addition, the RAID technology provides a fault tolerance function that is based on data check. When a fault of a magnetic disk causes an error or a loss to a data block in a stripe, data in the faulty magnetic disk can be recovered based on other data blocks and parity data in the stripe.

However, in the storage system using the RAID technology, if a fraction of data in a stripe needs to be updated, data in the stripe corresponding to a current update location needs to be read into a memory, and then this fraction of data is updated. After the update, parity data is recalculated, and then updated data and the recalculated parity data are written back into a magnetic disk. In this updating method, an amount of data that is actually written is greater than an amount of data that needs to be written, causing write amplification (WA) of the system and making update performance of the system relatively poor.

SUMMARY

Embodiments of this application provide a data updating technology, so as to improve update performance of a storage system while ensuring reliability of updated data.

According to a first aspect, this application provides a data updating method. The method may be applied to a storage system including a management node and a plurality of storage nodes. The plurality of storage nodes form a redundant array of independent disks RAID. In the storage system, after the management node receives a write request carrying to-be-written data, the management node may obtain at least one update data chunk based on the to-be-written data. The at least one update data chunk forms an update stripe. The update stripe is used to update some data blocks in a stripe in the RAID. The stripe includes data blocks and a parity block that are separately stored in the plurality of storage nodes. After obtaining the update stripe, the management node may send an update request to a first storage node in the plurality of storage nodes. The update request carries an update data chunk in the update stripe and integrity information of the update stripe. The update data chunk is used to update data of a first data block in the stripe. The first data block is any data block in the stripe.

After the first storage node determines, based on the integrity information of the update stripe, that the update stripe is an incomplete stripe, the first storage node inserts a data node into a log chain of the first data block, where information about the update data chunk is recorded in the inserted data node. The log chain of the first data block is stored in a non-volatile memory NVM of the first storage node, information about updated data of the first data block in at least one update process is recorded in the log chain of the first data block, and the information about the update data chunk includes the update data chunk or a storage address of the update data chunk in the NVM of the first storage node.

In the data updating method provided in this application, in a process in which data in a stripe needs to be updated, when the management node determines that not all data in an entire stripe is updated during current updating, the management node directly sends an update data chunk to a corresponding storage node. If the storage node receiving the update data chunk determines that an update stripe to which the update data chunk belongs is an incomplete stripe, the storage node does not directly update, based on the update data chunk, a data block that is in the corresponding stripe and that is stored in an external storage device, but stores the update data chunk into a non-volatile memory NVM of the storage node in a log chain manner. In this way, write amplification problems caused in a stripe update process can be reduced, thereby improving update performance of the storage system.

The NVM is non-volatile, so that security of the update data chunk stored in a PCM can be ensured. In addition, the updated data is stored in the NVM in the log chain manner. In this manner, not only data security can be ensured, but also updated data of a data block in the stripe in a plurality of update processes can be recorded in a time sequence. This facilitates identification of a version relationship of the update data chunk, and ensures consistency between stored data and written data. In addition, because the update data chunk recorded in the log chain is not updated data at a granularity of a data block in the stripe, the data updating method of the present invention can support fine-grained updating of the stripe.

In a possible implementation, the first storage node may further send a backup request to a second storage node in the plurality of storage nodes, where the backup request carries the update data chunk, and the backup request is used to instruct the second storage node to back up the update data chunk. After receiving the backup request, the second storage node inserts a data node into a backup log chain of the first data block, where the data node inserted into the backup log chain includes backup information of the update data chunk. The backup information of the update data chunk includes the update data chunk or a storage address of the update data chunk in an NVM of the second storage node. The backup log chain of the first data block is stored in the NVM of the second storage node.

In the data updating method provided in this application, on a basis of using the log chain manner to record the update data chunk, a multi-copy manner is further used to back up the update data chunk. In this implementation, even if a storage node becomes faulty before the update data chunk is stored into an external storage device (for example, a magnetic disk) of the storage node, data stored in the faulty storage node can still be recovered and updated using data and a log chain that are stored in another storage node or the update data chunk recorded in the backup log chain, thereby further ensuring data security.

Further, in the data updating method provided in this application, the first storage node writes the to-be-written update data chunk into the NVM of the first storage node, and after the update data chunk is backed up in the second storage node, the first storage node may return a write success message to the management node. The write success message is used to indicate that the update data chunk has been successfully written into the storage node. In this way, a processing delay of an access request can be reduced.

In another possible implementation, when the first storage node determines that the log chain of the first data block is not stored in the NVM of the first storage node, the first storage node may create a log chain for the first data block in the NVM of the first storage node, so that a data node can be inserted into the newly created log chain, and the information about the update data chunk is recorded in the inserted data node. Specifically, the first storage node may determine, based on a stripe ID and a block ID that are carried in the update request, whether the log chain of the first data block is stored in the NVM of the first storage node.

In still another possible implementation, in a process of performing an operation of inserting a data node into a log chain of the first data block, the first storage node may insert the data node at an end or a header of the log chain of the first data block. After the data node is inserted, the log chain of the first data block includes at least two data nodes that are sequentially linked based on an update sequence of the first data block. In this manner of sequentially inserting data nodes, update data chunks recorded in different data nodes in the log chain can be linked based on a sequence of updating the first data block. In this way, different update versions of the first data block can be identified based on a sequence of the data nodes in the log chain of the first data block, and data reading correctness can be ensured in a data reading process.

In still another possible implementation, after the first storage node stores the update data chunk in the log chain of the first data block, the management node may update management information of the stripe. The management information of the stripe includes a quantity of update times of the stripe, an updated data amount of the stripe, or an update time of the stripe.

In another possible implementation, when the management node determines that the management information of the stripe meets a preset condition, the management node may send a read request to the plurality of storage nodes, where the read request is used to read the data blocks in the stripe that are stored in the plurality of storage nodes. After receiving updated data blocks in the stripe that are returned by the plurality of storage nodes, the management node may calculate an updated parity block based on the updated data blocks in the stripe that are returned by the plurality of storage nodes. The updated data blocks in the stripe include an updated first data block returned by the first storage node, and the updated first data block is obtained based on information about at least one update data chunk in the log chain of the first data block and the first data block stored in the first storage node. Then, the management node separately stores data blocks and a parity block in an updated stripe into external storage devices of the plurality of storage nodes. The updated stripe includes the updated first data block and the updated parity block. Specifically, the preset condition for the management information may include: (1) the quantity of update times of the stripe is greater than a first threshold; (2) the updated data amount of the stripe reaches a second threshold; or (3) the update time of the stripe reaches a predetermined time. Based on the foregoing data updating method, in this data updating method, the update data chunk recorded in the NVM of the storage node is updated to a corresponding data block in the stripe only when a particular condition is met, the updated parity block is obtained based on the updated data block, and the updated data block and the updated parity block are written into magnetic disks of the storage nodes, thereby ensuring data security. In addition, in this manner, update data chunks in a plurality of modification processes are postponed for merging, and then stored into the magnetic disks of the storage nodes. In comparison with an existing stripe updating method, this can reduce write amplification problems of the storage system, thereby improving update performance of the storage system.

Further, after the data blocks and the parity block in the updated stripe are separately stored into the external storage devices of the plurality of storage nodes, the management node may invalidate the management information of the stripe, and the first storage node may release storage space occupied by the log chain of the first data block. In this way, storage space of the storage system can be saved.

In still another possible implementation, after the first storage node receives the read request sent by the management node, when the first storage node determines, based on an identifier of the stripe and an identifier of the first data block, that the log chain of the first data block is stored in the NVM of the first storage node, the first storage node may obtain the updated first data block based on information about at least one update data chunk recorded in the log chain of the first data block and the first data block stored in the first storage node, and send the updated first data block to the management node. In this manner, when an update data chunk of the first data block is not stored into an external storage device of the first storage node, if the first storage node receives the read request for reading the first data block, the first storage node can still obtain a latest first data block based on the update data chunk recorded in the log chain in the NVM of the first storage node, thereby ensuring data consistency.

In still another possible implementation, in a process of obtaining the updated first data block, the first storage node may determine valid data in the log chain of the first data block based on the information about the at least one update data chunk recorded in the log chain of the first data block, and merge the valid data into the first data block, to obtain the updated first data block. The valid data is latest modified data of the first data block, and the first data block is read by the first storage node from the external storage device of the first storage node.

In still another possible implementation, the log chain of the first data block further includes an offset of the update data chunk in the first data block, a length of the update data chunk, and address information of an adjacent data node of the inserted data node.

According to a second aspect, this application provides another data updating method, where the method is performed by a first storage node in a storage system including a management node and a plurality of storage nodes. The plurality of storage nodes form a redundant array of independent disks RAID, and the first storage node includes a non-volatile memory NVM. In the data updating method provided in the second aspect, the first storage node performs a method performed by the first storage node in the data updating method provided in the first aspect and any possible implementation of the first aspect.

According to a third aspect, this application provides a storage system. The storage system includes a management node and a plurality of storage nodes, and the plurality of storage nodes form a redundant array of independent disks RAID. The management node and a first storage node in the plurality of storage nodes are configured to perform the data updating method provided in the first aspect and any possible implementation of the first aspect.

According to a fourth aspect, this application provides a storage node. The storage node is used as a first storage node in a storage system. The storage system includes a management node and a plurality of storage nodes. The plurality of storage nodes include the first storage node, and the plurality of storage nodes form a redundant array of independent disks RAID. The first storage node includes a non-volatile memory NVM and a processor connected to the NVM. The processor is configured to perform a method performed by the first storage node in the data updating method provided in the first aspect and each possible implementation of the first aspect. That is, the processor is configured to perform the data updating method provided in the second aspect.

According to a fifth aspect, this application provides another storage node. The storage node is used as a first storage node in a storage system. The storage system includes a management node and a plurality of storage nodes. The plurality of storage nodes include the first storage node, and the plurality of storage nodes form a redundant array of independent disks RAID. The storage node includes a module configured to perform the data updating method provided in the second aspect.

According to a sixth aspect, this application provides a computer program product, including a computer readable storage medium that stores program code. An instruction included in the program code is used to perform at least one method in the first aspect or the second aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention.

DESCRIPTION OF EMBODIMENTS

To make a person skilled in the art understand the technical solutions in the present invention better, the following describes the technical solutions in the embodiments of the present invention with reference to the accompanying drawings in the embodiments of the present invention. Apparently, the described embodiments are merely some rather than all of the embodiments of the present invention.

Figure 1:
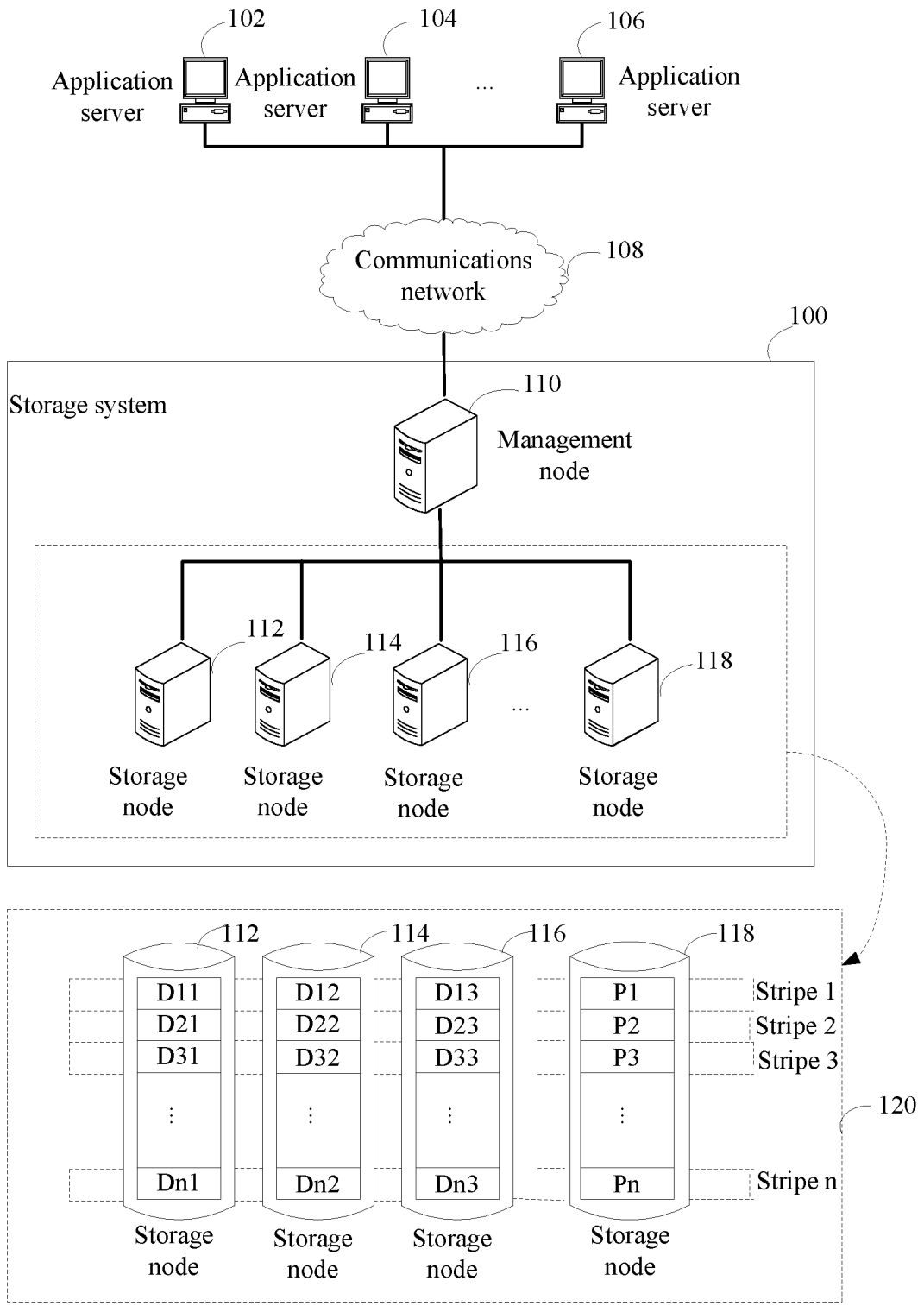
FIG. 1 is a schematic structural diagram of a storage system according to an embodiment of the present invention.

FIG. 1 is a schematic structural diagram of a storage system according to an embodiment of the present invention. As shown in FIG. 1, a storage system 100 may include a management node 110 and a plurality of storage nodes (for example, storage nodes 112, 114, 116, and 118). The storage system 100 may bidirectionally communicate with a plurality of application servers (for example, application servers 102, 104, and 106) using a communications network 108. The communications network 108 may include a cable and a wireless communications connection, or the communications network 108 may include Ethernet, an optical fiber, and the like. In addition, the communications network 108 may include any interface that is between a storage device and an application server and that is known in a current technology, such as a fiber channel switch or another existing switch. A specific form of the communications network 108 is not limited in this embodiment of the present invention, provided that a communications connection can be established between the application server and the storage node.

The application servers 102, 104, and 106 may include a computing device such as a personal computer or a network computer. The application servers 102, 104, and 106 may run an operating system and various application programs. The management node 110 is a node that is used in the storage system 100 and that has management and control functions. The management node 110 may be a controller, or may be a server computer. In this embodiment of the present invention, the management node 110 may be configured to: receive access requests sent by the application servers 102, 104, and 106, and forward the received access requests to the storage nodes 112, 114, 116, and 118, so as to implement access to the storage nodes 112, 114, 116, and 118. For example, in a case, the management node 110 may receive a read request sent by the application server 102, 104, or 106, forward the received read request to a storage node storing accessed data, receive data returned by the storage node, and then return the data to the application server 102, 104, or 106. In another case, the management node 110 may receive a write request sent by the application server 102, 104, or 106, and separately send to-be-written data to the storage nodes 112, 114, 116, and 118, so as to store the data in the storage nodes 112, 114, 116, and 118.

In this embodiment of the present invention, the management node 110 further maintains management information of the data stored in the storage nodes 112, 114, 116, and 118. For example, when the storage nodes 112, 114, 116, and 118 store data in a RAID manner, the management node 110 maintains update information of each stripe (stripe), so as to write updated data of the stripe back into a magnetic disk based on the update information of the stripe. The update information of the stripe may include a quantity of update times of the stripe, an updated data amount of the stripe, or an update time of the stripe.

In this embodiment of the present invention, a stripe is a set of data blocks that are written in parallel into storage nodes forming a RAID. The data blocks in the stripe have a same size, and data blocks in a same stripe have a same offset location in the storage nodes. A data block in the stripe is also referred to as a strip (strip). The strip is an area including several constant-size magnetic disk blocks with consecutive addresses. That is, the strip is a consecutive address block. A data block described in this embodiment of the present invention is a data unit including data. A parity block described in this embodiment of the present invention is a data unit including parity data.

The storage nodes 112, 114, 116, and 118 may be intelligent devices having computing and storage functions. Specifically, each storage node may be a computer that runs an operating system and that can provide data storage, obtaining, and management services. Each storage node may include a storage component used to store user data, such as a magnetic disk or a solid state drive. For example, the storage nodes 112, 114, 116, and 118 may be object storage devices (OSD).

Figure 2:
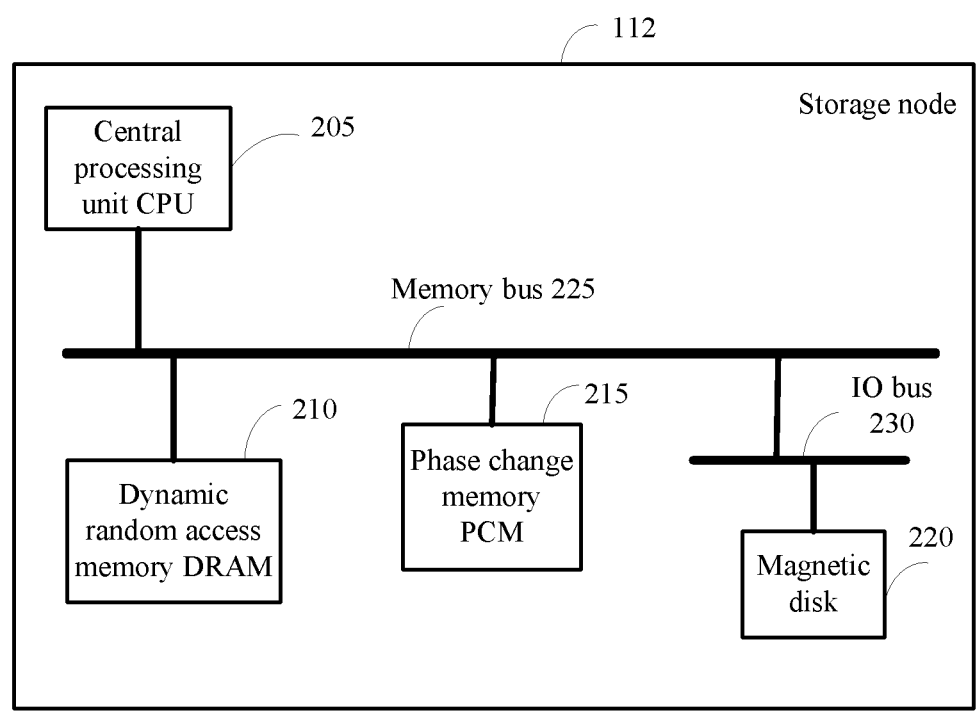
FIG. 2 is a schematic structural diagram of a storage node according to an embodiment of the present invention.

In this embodiment of the present invention, for specific structures of the management node 110 and the storage nodes 112, 114, 116, and 118, refer to FIG. 2. FIG. 2 is a schematic structural diagram of a storage node according to an embodiment of the present invention. For ease of description, in FIG. 2, the storage node 112 is used as an example to describe an architecture of the storage node provided in this embodiment of the present invention. As shown in FIG. 2, the storage node 112 may include a central processing unit (CPU) 205, a dynamic random access memory (DRAM) 210, a phase change memory (PCM) 215, and a magnetic disk 220. Both the DRAM 210 and the PCM 215 serve as a memory of the storage node 112.

The central processing unit (CPU) 205 is a core of the storage node 112. The CPU 205 may invoke different software programs in the storage node 112 to implement different functions. For example, the CPU 205 can implement access to the DRAM 210, the PCM 215, and the magnetic disk 220. It may be understood that, in this embodiment of the present invention, the CPU 205 is merely an example of a processor. The processor may be the CPU 205, or may be another application-specific integrated circuit (ASIC) or one or more integrated circuits configured to implement this embodiment of the present invention.

The dynamic random access memory (DRAM) 210 is connected to the CPU 205 using a memory bus. For example, the DRAM 120 may bidirectionally communicate with the CPU 205 using a northbridge and a memory bus 225. The CPU 205 can access the DRAM 210 at a high speed and perform a read or write operation on the DRAM 210. The DRAM 210 has an advantage of a high access speed. Therefore, the DRAM 210 is usually used as a main memory. The DRAM 210 is usually configured to store software running on an operating system, input and output data, information exchanged with an external storage, and the like. However, the DRAM 210 is volatile. After the storage node 112 is powered off, information in the DRAM 210 is no longer stored. A person skilled in the art knows that the DRAM is a volatile memory, and in actual application, another random access memory (RAM) may be used as the memory of the storage node 112. For example, a static random access memory (SRAM) may be used as the memory of the storage node 112.

The PCM 215 is a new non-volatile memory (NVM). In this embodiment of the present invention, the PCM 215 together with the DRAM 210 may serve as the memory of the storage node 112. Addressing can be performed in bytes in the new NVM, and data is written into the non-volatile memory on a byte basis. Therefore, the new NVM can be used as a memory. Compared with the DRAM 210, the PCM 215 is non-volatile, and therefore can store data better. In this embodiment of the present invention, the non-volatile memory that can be used as the memory may be referred to as a storage class memory (SCM). It should be noted that, in this embodiment of the present invention, the PCM 215 shown in FIG. 2 is merely an example of the SCM. In addition to the PCM, the SCM may include another new non-volatile memory such as a resistive random access memory (RRAM), a magnetic random access memory (MRAM), or a ferroelectric random access memory (FRAM). A specific type of the SCM is not limited in this embodiment of the present invention.

The magnetic disk 220 may bidirectionally communicate with the CPU 205 using an I/O bus 230. For example, the magnetic disk 220 may be connected to a southbridge using an interface such as a serial ATA (serial advanced technology attachment, SATA) interface or a small computer system interface (SCSI) and an I/O bus and bidirectional communicate with the CPU 205 using the southbridge. The magnetic disk 220 is configured to store data, and is used as an external storage device of the storage node 112. Usually, a storage medium used as the external storage device needs to be non-volatile and after the storage node 112 is powered off, data stored in the external storage is not lost. In addition, the external storage has a relatively high storage capacity. It may be understood that the magnetic disk 220 is merely an example of the external storage device. In addition to the magnetic disk 220, a storage used as the external storage device may be another non-volatile storage device that can store data, such as a solid state drive (SSD), a hard disk drive (HDD), an optical disc, or a storage array.

It may be understood that the storage node 112 shown in FIG. 2 is merely an example of the storage device. In actual application, with development of computer technologies, in a new generation computer system, the DRAM 210 and the PCM 215 may bidirectionally communicate with the CPU 205 using a double data rate (DDR) bus. In addition, the CPU 205 may be connected to the magnetic disk 220 using a host bus adapter (HBA). A specific connection form between internal components of the storage node 112 is not limited in this embodiment of the present invention, provided that the storage node 112 includes a non-volatile memory (NVM). That is, the storage node 112 in this embodiment of the present invention may be a computing device including a persistent memory (PM) and having computing and storage functions. It should be noted that, in this embodiment of the present invention, the management node 110 may have a structure shown in FIG. 2, and alternatively, a memory of the management node 110 may not include the PCM 215.

A person skilled in the art may know that data security can be improved using a RAID technology to store data. In this embodiment of the present invention, to ensure security of stored data, RAID is implemented in a plurality of storage nodes in the storage system provided in this embodiment of the present invention. For example, RAID 7 may be implemented in the storage nodes 112, 114, 116, and 118. Specifically, a plurality of data blocks (for example, data blocks D11, D12, and D13 shown in FIG. 1) and a parity block (for example, a parity block P1) of the plurality of data blocks may form a stripe, and the plurality of data blocks and the parity block in the stripe are separately stored into different storage nodes. For example, the data block D11 is stored in the storage node 112, the data block D12 is stored in the storage node 114, the data block D13 is stored in the storage node 116, and the parity block P1 is stored in the storage node 118. In this way, a schematic storage structure 120 shown in FIG. 1 can be formed. A size of a data block is equal to a strip size. The strip size is also sometimes referred to as a block size, a chunk size, or a granularity, indicating a size of a data block written into each magnetic disk. Generally, the strip size is from 2 KB to 512 KB (or larger), and a value of the strip size is 2 to the $n^{th}$ power, that is, 2 KB, 4 KB, 8 KB, 16 KB, or the like.

It may be understood that, in the storage nodes 112, 114, 116, and 118 provided in this embodiment of the present invention, at least one storage node may be used as a storage node that is specially used to store the parity block, and a same storage node may store parity blocks and data blocks in different stripes. A RAID implementation is not limited in this embodiment of the present invention, provided that a plurality of data blocks and parity blocks in a stripe can be separately stored in different storage nodes. In addition, a quantity of parity blocks in a stripe is not limited in this embodiment of the present invention.

As described above, the RAID technology can improve data storage security. However, a write amplification problem occurs in a process of updating a data block in a stripe. Consequently, an amount of data actually written into a magnetic disk of each storage node is greater than an amount of data that needs to be written into the magnetic disk. To reduce write amplification problems caused in the data block update process, and to improve update performance of the storage system while ensuring data security, in this embodiment of the present invention, updated data is stored in a PCM of each storage node in a process of performing a partial update on the stripe. In this embodiment of the present invention, the performing a partial update on the stripe means updating some data in the stripe. The following describes in detail a data updating method provided in an embodiment of the present invention and applied to the storage system 100. It should be noted that a RAID in the embodiments of the present invention is a RAID implemented based on an EC coding technology.

Figure 3:
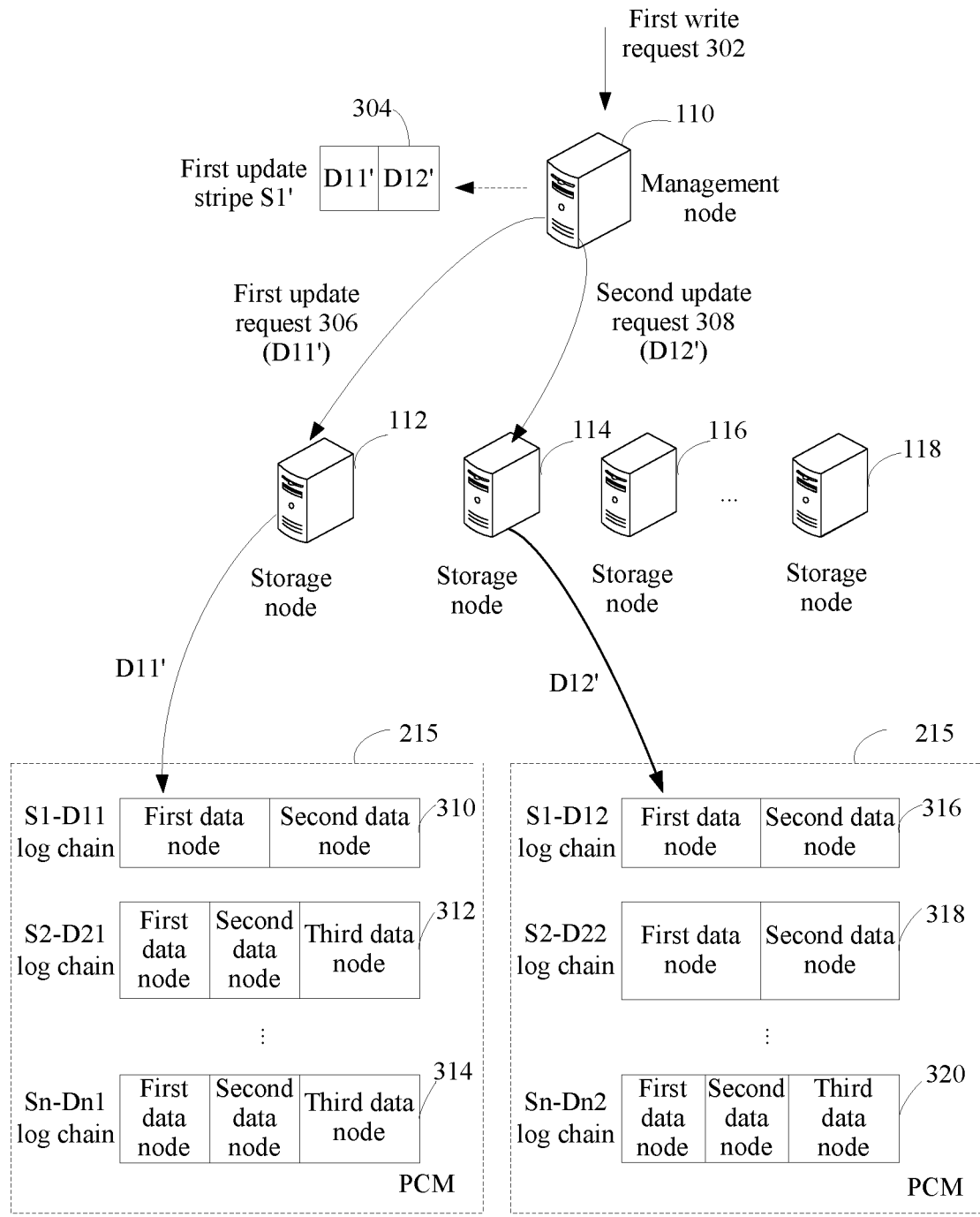
FIG. 3 is a signaling diagram of a data updating method according to an embodiment of the present invention.
Figure 4:
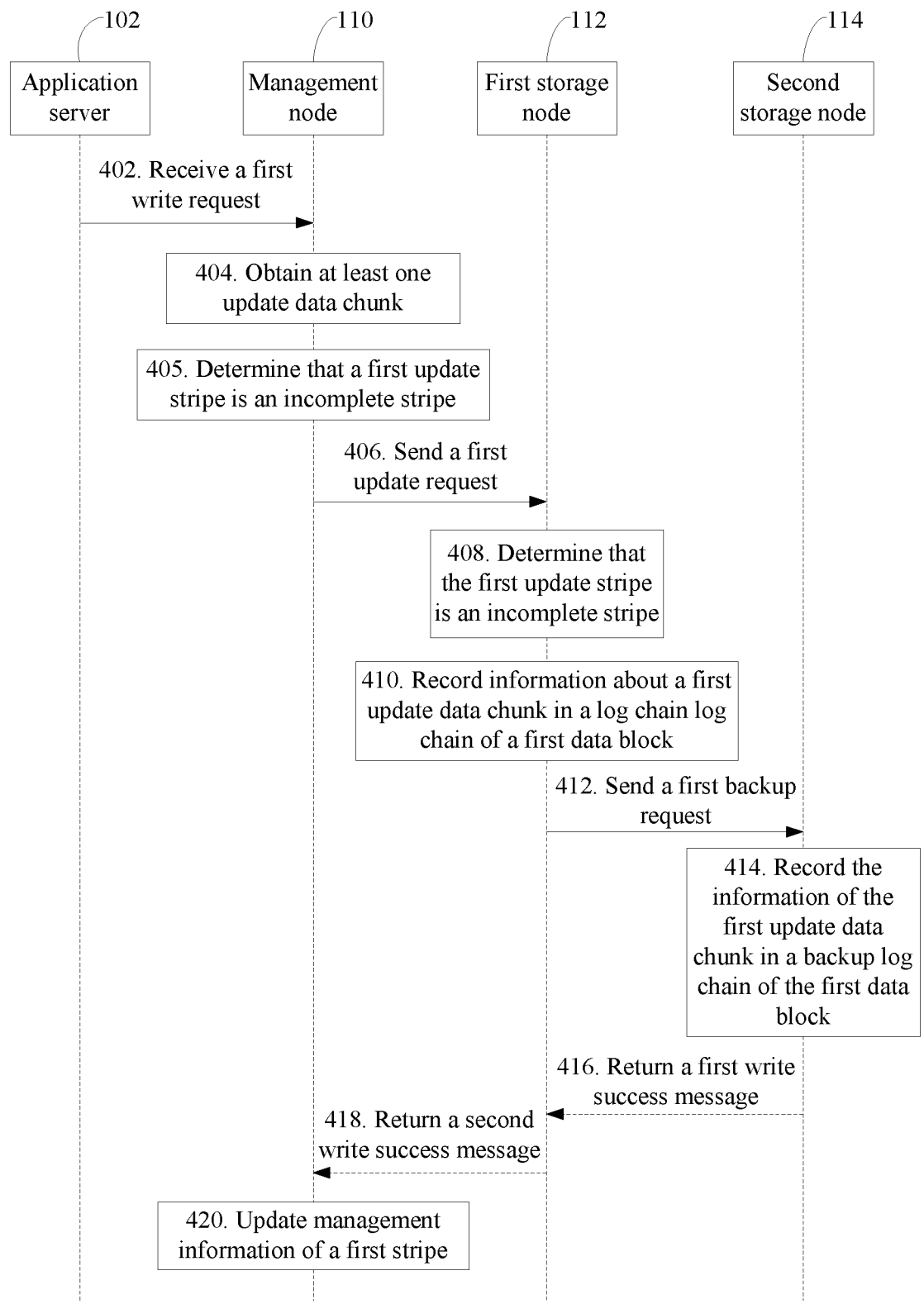
FIG. 4 is a signaling diagram of another data updating method according to an embodiment of the present invention.

For clarity of description, the following describes, in detail with reference to FIG. 3 and FIG. 4, how the storage system shown in FIG. 1 provided in the embodiment of the present invention updates data. It should be noted that, in this embodiment of the present invention, RAID is established in the storage nodes 112, 114, 116, and 118, data stored in the storage system is separately stored in the four storage nodes in a RAID form, and each stripe includes data blocks separately stored in the four storage nodes. FIG. 3 is a signaling diagram of a data updating method according to an embodiment of the present invention. FIG. 4 is another signaling diagram of the data updating method according to an embodiment of the present invention. For ease of description, the application server 102, the management node 110, the storage node 112, and the storage node 114 are used as an example in FIG. 3 and FIG. 4. In the following embodiments, the storage node 112 may also be referred to as a first storage node, and the storage node 114 may also be referred to as a second storage node. As shown in FIG. 4, the method may include the following steps.

In step 402, the management node 110 receives a first write request sent by the application server 102, where the first write request may be a first write request 302 shown in FIG. 3. In actual application, the first write request 302 may carry to-be-written data, a start address of the write request, and a size of the to-be-written data. The start address may be a logical address or may be a physical address, and the start address is used to indicate a start location of data to be updated based on the write request. For example, if the start address of the first write request 302 is 1 M, it indicates that a write operation starts from the first MB in storage space based on the first write request 302. A person skilled in the art may understand that the start address of 1 M is used to indicate a value obtained by 1024*1024.

After the management node 110 receives the first write request 302 sent by the application server 102, in step 404, the management node 110 can obtain at least one update data chunk and update information of the at least one update data chunk based on the start address, a stripe size of a stripe in the RAID, a strip size, and the size of the to-be-written data. In this embodiment of the present invention, the update data chunk is data used to update a data block in the stripe. The update data chunk is not larger than the data block in the stripe. The at least one update data chunk obtained based on the first write request 302 may be used to update at least one data block in one stripe, or may be used to update a plurality of data blocks in a plurality of stripes. That is, the at least one update data chunk may form one update stripe, or may form a plurality of update stripes. An update stripe includes update data chunks used to update data blocks in a same stripe.

In this embodiment of the present invention, the update information of the update data chunk may include a stripe ID, a block ID, a block length, a block offset, and stripe integrity information. The "stripe ID" is used to indicate an ID of a stripe to be updated based on the write request. The "stripe ID" is an index value of an update stripe. The "block ID" is used to indicate an ID of a data block that needs to be updated using the update data chunk, and is also used to indicate a logical location, in the stripe, of the data block that needs to be updated. Data blocks that need to be updated are data blocks in the stripe that are stored in the plurality of storage nodes. For example, in the RAID, a stripe 1 includes data blocks D11, D12, and D13, and a parity block P1, and a stripe 2 includes data blocks D21, D22, and D23, and a parity block P2. A stripe ID of the first stripe (that is, the stripe 1) in the RAID is 1. The stripe 1 includes the data blocks D11, D12, and D13, and the parity block P1. A block ID of the data block D11 is 1, a block ID of the data block D12 is 2, a block ID of the data block D13 is 3, a block ID of the parity block P1 is 4, and so on. It may be understood that a "stripe ID" and a "block ID" jointly form a unique identifier of a data block. A corresponding data block can be found using a "stripe ID" and a "block ID". Therefore, in this embodiment of the present invention, a data block to be updated using the update data chunk can be determined based on the "stripe ID" and the "block ID" of the update data chunk.

The "block length" is used to indicate a length of an update data chunk. In this embodiment of the present invention, the length of the update data chunk is not greater than a length of a data block in a stripe. That is, the update data chunk may be used to update all data of a data block in a stripe, or may be used to update some data of a data block in a stripe. The "block offset" is used to indicate a start location, in the data block in the stripe, of data to be updated using the update data chunk. The "stripe integrity" is used to indicate integrity of an update stripe including update data chunks used to update data blocks in a same stripe. In this embodiment of the present invention, update data chunks having a same stripe ID are update data chunks in a same update stripe. When a length of an update stripe including a plurality of update data chunks having a same stripe ID is equal to a specified total length of all data blocks in the stripe in the RAID, it is considered that the update stripe is a complete stripe.

In actual application, after the first write request 302 is received, because the first write request 302 carries the start address and the size of the to-be-written data, the management node 110 may obtain, by rounding up a quotient obtained by dividing the start address carried in the first write request 302 by a specified stripe size, an ID of a stripe to which the start location of the data to be updated based on the first write request 302 belongs. For ease of description, in this embodiment of the present invention, that the stripe size specified in the RAID is 4 MB and a strip size specified in the RAID is 1 MB is used as an example for description. If the start address carried in the first write request 302 is 0.5 M, the stripe ID is 1, and updating starts from the stripe 1 based on the first write request 302.

In actual application, the management node 110 may obtain, by rounding up a quotient obtained by dividing the start address carried in the first write request 302 by the specified strip size, an ID of a data block to which the start location of the data to be updated based on the first write request 302 belongs. For example, if the start address carried in the first write request 302 is 0.5 M and a strip size shown in FIG. 1 is 1 MB, a number of a start block in the update stripe is 1. In other words, based on the update stripe, updating starts from the first data block in the stripe 1. For example, updating starts from D11 in the stripe 1. Further, the management node 110 may obtain, by performing a modulo operation on the start address carried in the first write request 302 and the specified strip size, the start location of the data to be updated based on the first write request 302. For example, if the start address carried in the first write request 302 is 0.5 M and the strip size shown in FIG. 1 is 1 MB, the management node 110 may obtain, through calculation, that updating starts from the $0.5^{th}$ M of the first data block based on the first write request 302.

It may be understood that the foregoing descriptions of the manners of obtaining the ID of the stripe and the ID of the data block to which the start location of the data to be updated based on the first write request 302 belongs are merely an example. In actual application, because data blocks and parity blocks are distributed at different locations in a stripe, a stripe ID and a data block ID may be calculated in different manners. Specific manners of obtaining the ID of the stripe and the ID of the data block to which the start location of the data to be updated based on the first write request 302 belongs are not limited in this embodiment of the present invention.

After obtaining the start location of the data to be updated based on the first write request 302, the management node 110 can further divide the to-be-written data based on the size of the to-be-written data, the stripe size, and the strip size, to obtain the at least one update data chunk and the update information of the at least one update data chunk. That the stripe size is 4 MB and the strip size is 1 MB is still used as an example. In a case, it is assumed that the start address carried in the first write request 302 is 0.5 M and the size of the to-be-written data is 0.2 MB. That is, updating needs to start from the $0.5^{th}$ M based on the first write request 302, and an update data amount is 0.2 M bytes. In this case, a data block to be updated based on the first write request 302 is the first data block in the first stripe, a block offset of the update data chunk is 0.5 M, and a block length is 0.2 MB. Further, the management node 110 may obtain an update data chunk based on the to-be-written data. Specifically, in this case, the to-be-updated data block may be D11 in the stripe 1 shown in FIG. 1, and the data carried in the first write request 302 is an update data chunk D11'.

In another case, it is assumed that the start address of the to-be-written data carried in the first write request 302 is 0.5 M and the size of the to-be-written data is 1 MB, data blocks to be updated based on the first write request 302 are the first and second data blocks in the first stripe. Specifically, the to-be-updated data blocks may be D11 and D12 in the stripe 1 shown in FIG. 1, and update data chunks D11' and D12' are obtained. The update data chunk D11' is data from the $0^{th}$ M to the $0.5^{th}$ M in the to-be-written data. Because D11' is used to update data a location from the $0.5^{th}$ M to the first M in the first data block in the first stripe, a block offset of the update data chunk D11' is 0.5 M, and a block length of the update data chunk D11' is 0.5 MB. The update data chunk D12' is data from the $0.5^{th}$ M to the first M in the to-be-written data. Because D12' is used to update data a location from the $0^{th}$ M to the $0.5^{th}$ M in the second data block in the first stripe, a block offset of the update data chunk D12' is 0 M, and a block length of the update data chunk D12' is 0.5 MB.

It may be understood that, in actual application, there are a plurality of manners of obtaining the update data chunk. For example, in a case, the to-be-written data may be directly divided based on the start location of the first write request 302 and the specified strip size, so that a plurality of update data chunks can be obtained, and an update stripe can be determined based on a stripe ID of each update data chunk. In another case, at least one update stripe may be obtained based on the size of the to-be-written data and the specified stripe size, and then the at least one update stripe is divided based on the specified strip size, so that a plurality of update data chunks belonging to each update stripe are obtained. A specific manner of obtaining the update data chunk is not limited in this embodiment of the present invention.

A person skilled in the art may understand that, in actual application, because the to-be-written data in the write request received by the management node 110 has different sizes, the at least one update data chunk obtained by the management node 110 based on the received write request may form one update stripe, or may form a plurality of update stripes. That is, the write request received by the management node 110 may be used to update one stripe, or may be used to update a plurality of stripes. In this embodiment of the present invention, if the management node 110 obtains the plurality of update stripes, when an update stripe is a complete stripe, the management node 110 may obtain a parity block based on data blocks in the update stripe, and separately write the data blocks and the parity block in the complete stripe into the four storage nodes. When an update stripe is an incomplete stripe, a total size of update data chunks in the update stripe is smaller than that of all data blocks in a to-be-written stripe, and the management node 110 may separately send an update request to storage nodes to which data blocks to be updated using the update data chunks belong, so as to store updated data in the storage nodes.

A person skilled in the art may know that, when the update stripe is a complete stripe (that is, when the entire stripe is updated), a write amplification problem does not occur; and when the update stripe is an incomplete stripe (that is, when some data in the stripe is updated), the write amplification problem occurs. Therefore, in this embodiment of the present invention, updating an incomplete stripe is used as an example for description. It may be understood that, in this embodiment of the present invention, a same updating manner may be used to process an update data chunk in each incomplete update stripe.

For ease of description, a first update stripe S1' 304 in the at least one update stripe obtained based on the at least one update data chunk is used as an example for description in this embodiment of the present invention. As shown in FIG. 3, for ease of description, that the first update stripe S1' 304 includes two update data chunks D11' and D12' is used as an example, where D11' is used to update the data block D11 in the stripe 1 shown in FIG. 1, D12' is used to update the data block D12 in the stripe 1 shown in FIG. 1, and a total size of all update data chunks in the first update stripe S1' is smaller than that of all the data blocks in the to-be-updated stripe. It may be understood that data blocks forming the first update stripe S1' may be all data blocks obtained by the management node 110 in step 404, or may be some data blocks in data blocks obtained by the management node 110 in step 404.

After obtaining the first update stripe S1', in step 405, the management node 110 can determine whether the first update stripe S1' is a complete stripe. The write amplification problem occurs when the first update stripe S1' is an incomplete stripe. In FIG. 4, that the first update stripe S1' is an incomplete stripe is used as an example for illustration and description. After the management node 110 determines that the first update stripe S1' is an incomplete stripe, the management node 110 may send update requests to the storage nodes 112 and 114, respectively, to instruct the storage nodes 112 and 114 to store the update data chunks D11' and D12' in the first update stripe S1', respectively. For example, as shown in FIG. 3, the management node 110 may send a first update request 306 to the storage node 112, where the first update request 306 carries the update data chunk D11' and integrity information of the update stripe S1' to which the update data chunk D11' belongs. In addition, the management node 110 may send a second update request 308 to the storage node 114, where the second update request 308 carries the update data chunk D12' and the integrity information of the update stripe S1' to which the update data chunk D12' belongs. A manner of processing the update request by each storage node is similar. Therefore, in the following embodiments, a process of storing D11' by the storage node 112 is described in detail. For clarity of description, in this embodiment of the present invention, the update data chunk D11' may also be referred to as a first update data chunk D11', and the update data chunk D12' may also be referred to as a second update data chunk D12'.

As shown in FIG. 4, after the management node 110 determines that the first update stripe S1' is an incomplete stripe, in step 406, the management node 110 sends the first update request 306 to the first storage node 112. The first update request 306 carries the update data chunk D11' and update information of the update data chunk D11'. Specifically, the update information of the update data chunk D11' may include the foregoing stripe ID, block ID, block length, block offset, and stripe integrity information. As described above, the first update stripe S1' is an incomplete stripe. Therefore, to reduce write amplification, the first update request needs to carry the update data chunk D11' and the integrity information of the update stripe to which D11' belongs. After the first storage node 112 receives the first update request 306, the first storage node 112 can determine, based on the stripe integrity information in the first update request 306, that the first update stripe S1' is an incomplete stripe (refer to step 408). In actual application, "0" may be used to indicate that an update stripe is an incomplete stripe, and "1" may be used to indicate that an update stripe is a complete stripe. This is not limited herein.

In step 410, the first storage node 112 records information about the first update data chunk D11' in a log chain of a first data block D11. To reduce the write amplification problems caused in a stripe update process, and to ensure that updated data that is written is not lost when a power failure, a breakdown, a software fault, or the like occurs on the system, in this embodiment of the present invention, a manner of creating a log chain (log chain) in a PCM of a storage node is used to ensure security of the updated data before the updated data is written into an external storage device of the storage node. Specifically, in this embodiment of the present invention, when the first storage node 112 determines that the first update stripe S1' is an incomplete stripe, the first storage node 112 does not directly store the update data chunk D11' in an external storage device of the first storage node 112. That is, when the first storage node 112 determines that the first update stripe S1' is an incomplete stripe, the first storage node 112 does not directly use the update data chunk D11' to update the data block D11 stored in the storage node 112. In this case, the first storage node 112 temporarily stores the update data chunk D11' in a PCM 215 of the first storage node 112.

As shown in FIG. 3, in this embodiment of the present invention, a log chain may be created in a PCM 215 of each storage node for a data block stored in the storage node, to store an update data chunk used to update the data block. The storage structure 120 shown in FIG. 1 is still used as an example. As shown in FIG. 3, a log chain 310 is created for the data block D11 in the stripe 1 (S1) (which may also be indicated as an S1-D11 log chain 310) in the PCM 215 of the first storage node 112. Likewise, a log chain 312 may be created for the data block D21 in the stripe 2 (S2) in the PCM 215 of the first storage node 112; and in a PCM 215 of the second storage node 114, a log chain 316 may be created for the data block D12 in the stripe 1 (S1), or a log chain 318 may be created for the data block D22 in the stripe 2 (S2).

It should be noted that a storage node does not proactively create a log chain for each data block stored in the storage node, and creates a log chain in the PCM 215 for a data block that needs to be updated only when an update stripe is an incomplete stripe and an update data chunk in the update stripe needs to be stored in a PCM 215. As shown in FIG. 3, a log chain of a data block (for example, the S1-D11 log chain 310) may include at least one data node, and each data node is used to store information about updated data of the data block (for example, D11) in one update process. The following describes, in detail with reference to FIG. 5, a log chain of a data block in the stripe provided in this embodiment of the present invention.

Figure 5:
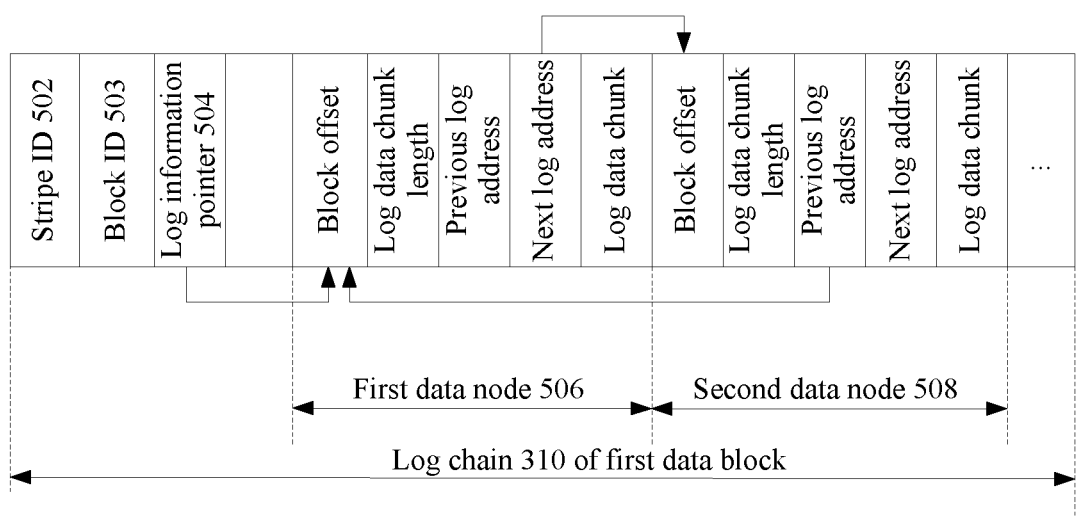
FIG. 5 is a schematic structural diagram of a log chain of a data block according to an embodiment of the present invention.

For clarity of description, in FIG. 5, a structure of the log chain 310 (which is indicated as the S1-D11 log chain 310 in FIG. 5) of the first data block D11 in the stripe 1 is used as an example for description. As described above, a log chain of each data block includes a data node generated in at least one update process of the data block. As shown in FIG. 5, the S1-D11 log chain 310 may include a stripe ID 502, a block ID 503, a log information pointer 504, a first data node 506, and a second data node 508. The following separately describes fields in the log chain in detail.

The "stripe ID" 502 and the "block ID" 503 jointly form an index value of the log chain of the data block. The "stripe ID" 502 is used to indicate an ID of the stripe to which the data block belongs, and the "block ID" 503 is used to indicate an ID of the data block. In this embodiment of the present invention, a "stripe ID" and a "block ID" form a unique identifier of a data block. Therefore, in a storage node, a log chain created for a data block may be indexed using a stripe ID of a stripe to which the data block belongs and a block ID of the data block. It may be understood that data blocks of different stripes may have a same block ID. In this embodiment of the present invention, when the storage node 112 determines, based on the first update request 306 sent by the management node 110, that the first update stripe S1' to which the update data chunk D11' belongs is an incomplete stripe, the storage node 112 can determine, based on a stripe ID of the first update stripe S1', whether the log chain of the data block D11 is stored in the storage node 112. If the log chain of the data block D11 is not found, a log chain needs to be created for the data block D11. If the log chain of the data block D11 is found, it indicates that the data block D11 has been updated before current updating and that the log chain of the data block D11 includes information about updated data in at least one update process.

The log information pointer 504 is used to point to the first data node in the log chain of the data block. Specifically, the log information pointer 504 may point to a start location of the first data node in the log chain. For example, as shown in FIG. 5, in the S1-D11 log chain 310, a start field in the first data node 506 is a "block offset" field. Therefore, the log information pointer 504 may point to a start address of the "block offset" field in the first data node 506.

As shown in FIG. 5, each data node (for example, the first data node 506 and the second data node 508) in the log chain of the data block D11 may include the following fields: a block offset, a log data chunk length, a previous log address, a next log address, and a log data chunk. The "block offset" field is used to indicate a start location, in the data block in the stripe, of data to be updated using the update data chunk. The "log data chunk length" field is used to indicate a length of the update data chunk. The "previous log address" field is used to point to an address of a previous data node. The "next log address" field is used to point to an address of a next data node. The "log data chunk" field is used to store the update data chunk or a storage address of the update data chunk in a PCM 125. Information about the "block offset" field and the "log data chunk length" field forms block location information of the update data chunk (for example, the update data chunk D11'), and the block location information is used to indicate a location, in the data block in the stripe, of data to be updated using a log data chunk (that is, the update data chunk) in a current data node.

In this embodiment of the present invention, the previous data node is a data node inserted previous to the current data node and is used to indicate information about an update data chunk of the data block in an update process previous to the current updating. Specifically, the "previous log address" is used to indicate a start address of the previous data node in the PCM 215. For example, as shown in FIG. 5, because the "block offset" field is the first field in the first data node, a "previous log address" in the second data node 508 may point to the "block offset" field in the previous data node. It may be understood that a "previous log address" field in the first data node in a log chain structure of a data block is empty. For example, the first data node 506 in FIG. 5 is the first data node in the log chain 310 of the first data block D11. Therefore, in the first data node 506, a "previous log address" field is empty.

In this embodiment of the present invention, the next data node is a data node inserted next to the current data node and is used to indicate information about updated data of the data block in an update process next to the current updating. Specifically, the "next log address" is used to indicate a start address of the next data node in the PCM 215. For example, as shown in FIG. 5, because the "block offset" field is the first field in the second data node 508, a "next log address" in the first data node 506 may point to the "block offset" field in the second data node 508. It may be understood that a "next log address" field in the last data node in a log chain of a data block is empty. When a "next log address" field in a data node is empty, it indicates that the data node stores information about updated data of a data block in the last update process, where the data block corresponds to the data node.

It may be understood that a data node is dynamically generated in the stripe update process. For example, it is assumed that the stripe 1 (S1) is updated twice, and update stripes in the first update process and the second update process are incomplete stripes. In this embodiment of the present invention, an update data chunk D11' of the first data block D11 in S1 in the first update process may be stored in the first data node 506, and an update data chunk of the first data block D11 in the second update process may be stored in the second data node 508. The "previous log address" and the "next log address" in each data node form pointer information pointing to another data node in the current data node. In this manner, the newly created data node may be linked to the log chain of the data block based on a creation time sequence, and different update versions of the data block in the stripe can be obtained based on information in the log chain of the data block. Further, in a process in which a computer system recovers from a fault, data written into the computer system can be recovered based on the log chain of the data block, so that data consistency can be ensured, and system management is facilitated.

In this embodiment of the present invention, the "log data chunk" field in the log chain is used to record information about the update data chunk. The information about the update data chunk may include the update data chunk and the storage address of the update data chunk in the PCM. For example, as shown in FIG. 5, a "log data chunk" field in the first data node 506 is used to indicate updated data of the first data block D11 in the stripe 1 in the first update process, and a "log data chunk" field in the second data node 508 is used to indicate updated data of the first data block D11 in the stripe 1 in the second update process. In actual application, in a case, the update data chunk may be directly recorded in the "log data chunk" field. In another case, the update data chunk may be stored in other storage space in the PCM 215, and then the storage address of the update data chunk in the PCM 215 is recorded in the "log data chunk" field. A manner of storing data in the log chain structure is not limited in this embodiment of the present invention, provided that updated data of the data block in the stripe in a plurality of update processes can be found based on the log chain.

For clarity of description, that the first storage node 112 stores the first update data chunk D11' in the first update stripe S1' shown in FIG. 3 is used as an example for description below. The first update stripe S1' includes the update data chunks D11' and D12', the update data chunk D11' is used to update data of the data block D11 that is in the stripe S1 and that is stored in the first storage node 112, and the update data chunk D12' is used to update data of the data block D12 that is in the stripe S1 and that is stored in the second storage node 112. It is assumed that the block offset of the update data chunk D11' is 0.5 M, and the block length of the update data chunk D11' is 0.5 MB. After the first storage node 112 receives the first update request 306, the first storage node 112 may search for the log chain of the first data block D11 based on a stripe ID and a block ID that are carried in the first update request 306.

In a case, if the first storage node 112 does not find the log chain of the first data block D11 based on the stripe ID, the first storage node 112 needs to create a log chain for the first data block D11 in the PCM 215 of the first storage node 112. When creating the log chain for the first data block D11, the first storage node 112 may allocate physical space in the PCM 215 of the first storage node 112 based on a size of the first update data chunk D11', and initialize a data structure, that is, the S1-D1 log chain 310, of the log chain of the first data block D11 in the allocated physical space. The first storage node 112 inserts the first data node 506 into the created log chain structure, and records the update information of the first update data chunk D11' in the first data node 506. Specifically, 0.5 M may be recorded in the block offset field in the first data node 506, 0.5 MB may be recorded in the log data chunk length field, and the first update data chunk D11' or a storage address of the first update data chunk D11' in the PCM 215 may be stored in the log data chunk field. Because the first data node 506 is the first data node in the S1-D1 log chain 310, the previous log address in the first data node 506 is empty. Because the first data node 506 is currently an only data node in the S1-D1 log chain 310, the "next log address" in the first data node 506 is empty.

In another case, if the first storage node 112 finds the log chain of the first data block D11, that is, the S1-D1 log chain 310, based on the stripe ID, and it is assumed that the S1-D1 log chain 310 includes the first data node 506, the first storage node 112 may generate a new data node (for example, the second data node 508) in the S1-D1 log chain 310, and record the second data node 508 in the update information of the first update data chunk D11'. Specifically, 0.5 M may be recorded in the "block offset" field in the second data node 508, 0.5 MB may be recorded in the "log data chunk length" field, the first update data chunk D11' or the storage address of the first update data chunk D11' in the PCM 215 may be recorded in the "log data chunk" field, and the "previous log address" field in the second data node 508 points to a start address of the first data node 506. Because the second data node 508 is currently the last data node in the S1-D1 log chain 310, a "next log address" in the second data node 508 is empty. In addition, after the second data node 508 is inserted, the "next log address" field in the first data node 506 needs to be updated, and the "next log address" field in the first data node 506 points to a start address of the second data node 508. For example, because the first field in the second data node 508 is a "block offset" field, the "next log address" field in the first data node 506 may point to the "block offset" field in the second data node 508.

It may be understood that, according to the data updating method provided in this embodiment of the present invention, in the stripe update process, a manner of sequentially recording the update data chunks in the log chain based on an update sequence facilitates identification of the different update versions of the data block in the stripe using a sequence of the data nodes in the log chain. In actual application, in a data node insertion process, the data nodes may be sequentially inserted at an end of the log chain based on a sequence from front to back, or the data nodes may be sequentially inserted at a header of the log chain based on a sequence from back to front. A specific insertion sequence is not limited in this embodiment of the present invention, provided that an update sequence of the data block can be identified based on the data nodes in the log chain.

In the foregoing manner, the first storage node 112 may store the update data chunk D11' in the PCM of the first storage node 112. However, because the first storage node 112 does not directly use the update data chunk D11' to update the data block D11 in the stripe, a multi-copy manner may also be used in this embodiment of the present invention to back up the first update data chunk D11', so as to further ensure data security and avoid a loss of the updated data of the stripe 1 caused by a fault of the first storage node 112. In a multi-copy technology, same data is backed up to a plurality of storage nodes for storage and management; and if a data error, a data loss, or the like occurs, a data copy may be obtained from another node.

Specifically, after the first storage node 112 records the update information of the first update data chunk in the log chain of the first data block, the first storage node 112 may send a first backup request to the second storage node 114 in the storage system (refer to step 412). The first backup request includes the first update data chunk and the update information of the first update data chunk, and the first backup request is used to instruct the second storage node 114 to back up the first update data chunk. That is, the first backup request is used to instruct the second storage node 114 to store a copy of the first update data chunk.

In step 414, the second storage node 114 records the update information of the first update data chunk D11' in a backup log chain of the first data block D11. In this embodiment of the present invention, the backup log chain of the first data block D11 may be created in the PCM of the second storage node 114. In this manner, an update data chunk of the first data block D11 in the at least one update process can be backed up in the second storage node 114. That is, the backup log chain of the first data block D11 is used to back up the update data chunk in the log chain of the first data block. It may be understood that a structure of the backup log chain is the same as the structure of the log chain shown in FIG. 5. For a manner of storing, by the second storage node 114, the update data chunk D11' in the backup log chain based on the first update request, refer to a manner of storing the first update data chunk D11' by the first storage node 112. In step 414, for a process of storing the update data chunk D11' by the second storage node 114, refer to descriptions in step 408 and step 410. It should be noted that a "log data chunk" field in the backup log chain is used to store the update data chunk D11' or a storage address of the update data chunk D11' in an NVM of the second storage node 114.

In step 416, after storing the first update data chunk D11' in the backup log chain of the first data block D11, the second storage node 114 may send a first write success message to the first storage node 112, where the first write success message is used to notify the first storage node 112 that the first update data chunk D11' has been successfully backed up in the second storage node 114. In step 418, after the first storage node 112 receives the first write success message returned by the second storage node 114, the first storage node 112 returns a second write success message to the management node 110, where the second write success message is used to notify the management node 110 that the first update data chunk D11' has been successfully stored in the first storage node 112. In this manner, a processing delay of processing an access request by the management node 110 can be reduced.

It should be noted that, in this embodiment of the present invention, the first storage node 112 and the second storage node 114 may be separately configured to store different data blocks in a same stripe. When a partial update is performed on the stripe, the second storage node 114 may also back up the update data chunk stored in the log chain in the first storage node 112. In this manner, data stored in the first storage node 112 is not identical with that stored in the second storage node 114. Likewise, when a partial update is performed on a stripe, the first storage node 112 may also back up the update data chunk in the log chain stored in the second storage node 114.

In actual application, to further improve security, a three-copy manner may be further used to back up the updated data. In this manner, in addition to backing up the first update data chunk D11' to the second storage node 114, the first storage node 112 may send a second backup request to a third storage node 116, so that the third storage node 116 backs up the first update data chunk D11' in a PCM 215 of the third storage node 116. Likewise, a backup log chain may be created for the first data block D11 in the third storage node 116, and the update information of the first update data chunk D11' is recorded in the backup log chain of the first data block D11 in the third storage node 116. For a manner of backing up the first update data chunk D11' by the third storage node 116, refer to the descriptions in step 408 and step 410. It should be noted that an update request or a backup request described in this embodiment of the present invention may be a write request used to write data.

How a storage node in the storage system 100 provided in the embodiment of the present invention updates some data blocks in a stripe is described above in detail using the example in which the first storage node 112 stores the first update data chunk D11' in the first update stripe S1'. It may be understood that the second storage node 114 may store the second update data chunk D12' in the first update stripe S1' in the manner used by the first storage node 112 to store the first update data chunk D11', and return an write success message to the management node 110 after the second update data chunk D12' is stored. In step 420, after the management node 110 receives the write success messages returned by the first storage node 112 and the second storage node 114, the management node 110 may determine that the update data chunk in the first update stripe has been separately stored in the storage nodes. In this case, the management node 110 may update management information of the first stripe (S1).

As described above, in this embodiment of the present invention, when the update stripe is an incomplete stripe, the management node 110 needs to record management information of the stripe, so that updated data of the stripe can be merged and updated subsequently based on the management information of the stripe. In a case, the management information of the stripe may include a quantity of update times of the stripe. The stripe ID is used to index the management information of the stripe. The quantity of update times of the stripe is used to record a quantity of update times in a preset time. In actual application, after the management node receives a write success message returned by a storage node corresponding to the data block in the update stripe, the management node 110 may update a quantity of update times of the first stripe S1. For example, the management node 110 may increase the quantity of update times of the first stripe S1 by 1. In another case, the management information of the stripe may include an updated data amount of the stripe. For example, the management node 110 may update an updated data amount of the first stripe based on the size of the update data chunk in the first update stripe S1, where the updated data amount of the first stripe is a total amount of updated data of the first stripe in the at least one update process. In another case, the management information of the stripe may further include an update time of the stripe.

In this embodiment of the present invention, when the management node 110 needs to modify data in a stripe based on a write request, and when the management node 110 determines that an update stripe is an incomplete stripe, or when not all data in the entire stripe is updated during current updating, the management node 110 directly sends an update data chunk to a corresponding storage node (for example, the first storage node 112). After the storage node receives the update data chunk sent by the management node 110, if the storage node determines that the update stripe to which the update data chunk belongs is an incomplete stripe, the storage node does not directly update a data block in the entire stripe, but stores and manages the update data chunk in the log chain manner. In this way, the write amplification problems caused in the stripe update process can be reduced.

Because a PCM is non-volatile, the update data chunk stored in the PCM is not lost when a power failure occurs on the storage node. In addition, updated data is recorded and stored in the PCM in a log chain manner, and updated data of a data block in the stripe in a plurality of update processes can be recorded in a time sequence. This facilitates identification of a version relationship of the update data chunk, and ensures consistency between stored data and written data. In a data reading process, valid data of a data block can be determined based on time for writing a log data chunk into a log chain of the data block, thereby ensuring data reading correctness. When the power failure or a breakdown occurs on the storage node, the storage node can recover data based on information about the update data chunk recorded in the log chain in the PCM, so that the update data chunk stored in the PCM is not lost, and security of the update data chunk can be ensured. Further, the storage node may further send the update data chunk to another storage node, so that the other storage node can back up the update data chunk, and the security of the update data chunk is further improved.

In the storage system 100 provided in the embodiment of the present invention, after some update data chunks in a stripe are written into PCMs 215 of some storage nodes using the method shown in FIG. 4, to save storage space of the storage nodes, storage space of the PCMs 215 of the storage nodes needs to be reclaimed in time. In this case, data blocks in log chains in the PCMs 215 of the storage nodes need to be flushed to magnetic disks of the storage nodes, and security of all data needs to be ensured. The following describes, in detail with reference to FIG. 6, a specific method for flushing the update data chunks recorded in the log chains to the magnetic disks of the storage nodes.

Figure 6:
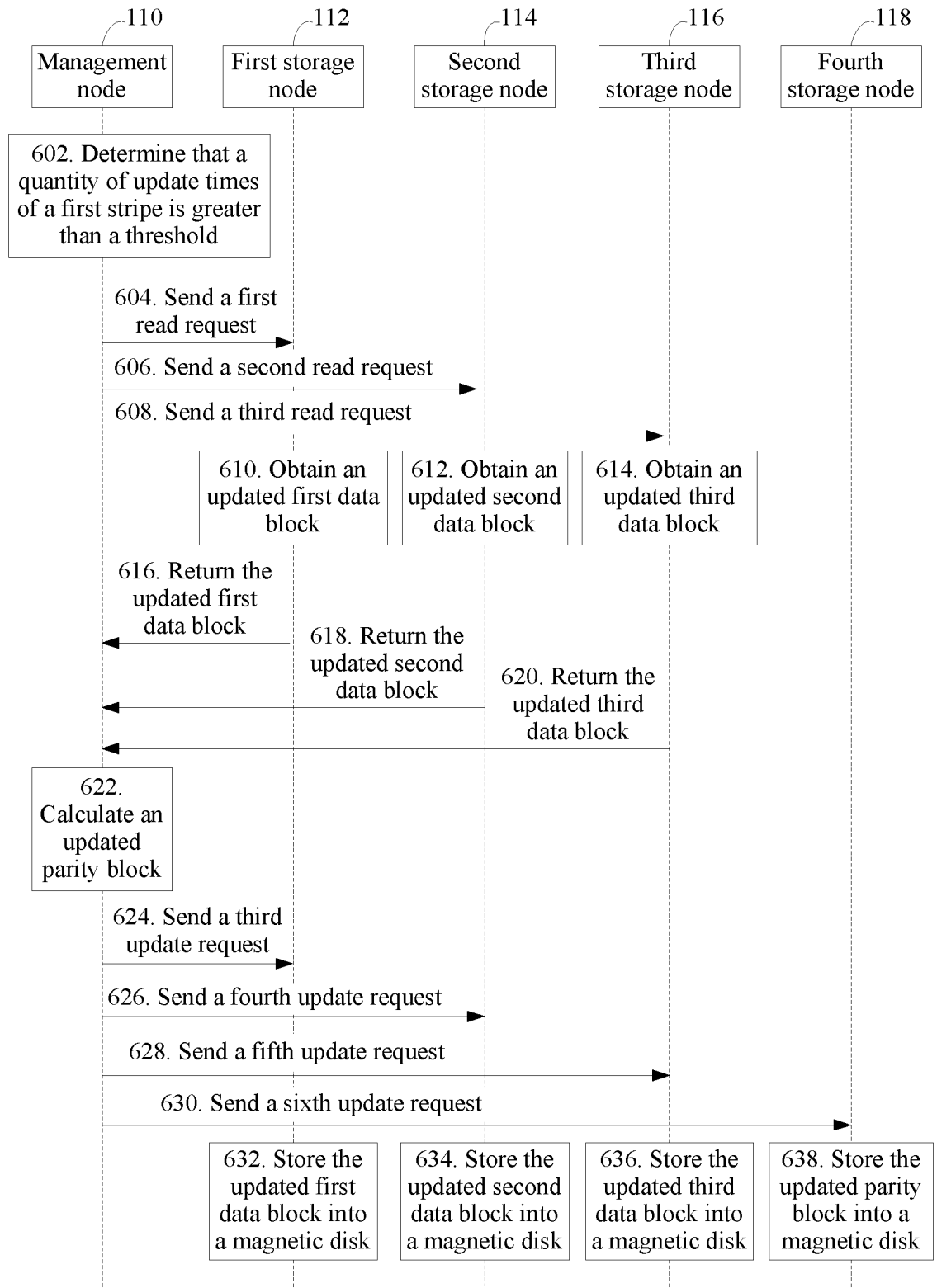
FIG. 6 is a signaling diagram of a method for writing data from a PCM into a magnetic disk according to an embodiment of the present invention.

FIG. 6 shows a method for writing data from a PCM into a magnetic disk according to an embodiment of the present invention. It may be understood that, in actual application, the management node 110 may separately trigger, for a plurality of stripes based on management information of the plurality of stripes that is stored in the management node 110, an operation shown in FIG. 6 of flushing updated data from a PCM to a magnetic disk, so that update data chunks in the plurality of stripes can be written into the magnetic disks of the storage nodes. For clarity of description, the first stripe S1 shown in FIG. 3 and the first data block D11 in the first stripe S1 are still used as an example for description. As shown in FIG. 6, the method may include the following steps.

In step 602, the management node 110 determines that a quantity of update times of the first stripe is greater than a threshold. In this embodiment of the present invention, to reclaim storage space of a storage node in time, a threshold may be set. When a quantity of modification times of the stripe is greater than the specified threshold, an update data chunk recorded in a log chain in the storage node may be flushed to a magnetic disk of the storage node, so that the storage space of a PCM 215 of the storage node can be reclaimed. For example, the threshold of the quantity of modification times may be set to 5. When a quantity of modification times of a stripe is greater than 5, an update data chunk in the stripe needs to be written from the PCM of the storage node into the magnetic disk. As described above, in step 420, after the management node 110 receives the write success messages returned by the storage nodes, the management node 110 updates the management information of the first stripe. For example, the management node 110 updates a quantity of update times of the first stripe, an updated data amount of the first stripe, or an update time of the first stripe. Further, in step 602, the management node 110 may obtain the quantity of modification times, the updated data amount, or the update time of the first stripe based on a specified time, determine whether the management information of the first stripe meets a preset condition, and merge and store updated data of the first stripe into external storage devices of the storage nodes when the management information of the stripe meets the preset condition.

In this embodiment of the present invention, the preset condition for the management information may include: (1) the quantity of update times of the first stripe is greater than a first threshold; (2) the updated data amount of the first stripe reaches a second threshold; or (3) the update time of the first stripe reaches a predetermined time. For ease of description, in the embodiment shown in FIG. 6, that storing the updated data into the magnetic disks of the storage nodes is triggered when it is determined that the quantity of update times of the first stripe reaches a preset threshold is used as an example for description.

In step 604 to step 608, the management node 110 separately sends read requests to the first storage node 112, the second storage node 114, and the third storage node 116, to read data blocks in the first stripe. Specifically, as shown in FIG. 6, in step 604, the management node 110 may send a first read request to the first storage node 112, to read the first data block D11 that is in the first stripe and that is stored in the first storage node 112. In step 606, the management node 110 may send a second read request to the second storage node 114, to read the second data block D12 that is in the first stripe and that is stored in the second storage node 114. In step 608, the management node 110 may send a third read request to the third storage node 116, to read the third data block D13 that is in the first stripe and that is stored in the third storage node 116. In actual application, each read request may carry a stripe ID of the first stripe S1 and an ID of a data block to be read. For example, the first read request needs to carry the stripe ID of the first stripe S1 and an ID of the first data block D11, and the second read request needs to carry the stripe ID of the first stripe S1 and an ID of the second data block D12. It may be understood that the management node 110 may send the read requests to the first storage node 112, the second storage node 114, and the third storage node 116 in parallel.

After the storage nodes receive the read requests sent by the management node 110, in step 610 to step 614, the storage nodes separately obtain the data blocks in the stripe that are stored in the storage nodes. For example, in step 610, the first storage node 112 obtains an updated first data block D11" stored in the first storage node 112. In step 612, the second storage node 114 obtains an updated second data block D12" stored in the second storage node 114. In step 614, the third storage node 116 obtains an updated third data block D13" stored in the third storage node 116. A process of obtaining the data blocks by the storage nodes is described below in detail using an example in which the first storage node 112 obtains the updated first data block D11".

Specifically, after the first storage node 112 receives the first read request sent by the management node 110, the first storage node 112 may determine, based on the stripe ID of the first stripe in the first read request, whether a log chain of the first data block D11 in the first stripe is stored in a PCM of the first storage node 112. If the log chain of the first data block D11 in the first stripe is not stored in the PCM of the first storage node 112, it indicates that the first data block D11 is not updated after being written into a magnetic disk of the first storage node 112 last time, and the first storage node 112 may directly read the first data block D11 from the magnetic disk of the first storage node 112 as the updated first data block D11". If the first storage node 112 determines that the log chain of the first data block D11 in the first stripe is stored in the PCM of the first storage node 112, it indicates that the first data block D11 is updated after being written into the magnetic disk of the first storage node 112 last time, and in this case, the first storage node 112 needs to merge an update data chunk recorded in the log chain and the first data block D11 stored in the magnetic disk, to obtain the updated first data block D11".

Figure 7:
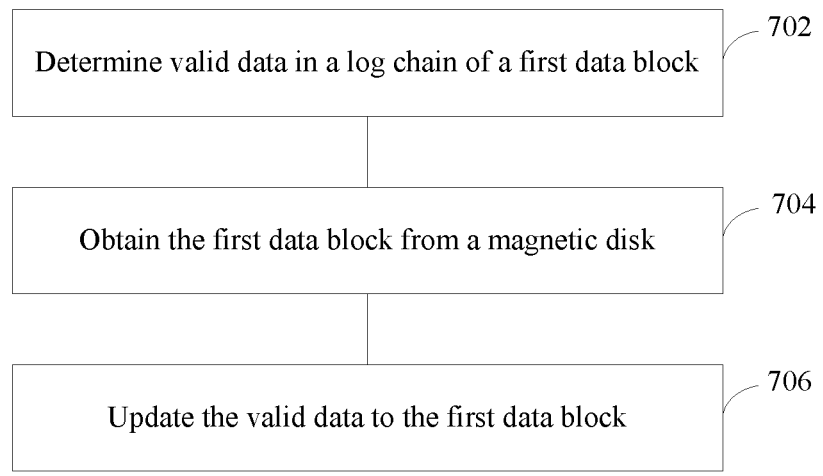
FIG. 7 is a flowchart of a data merging method according to an embodiment of the present invention.

How the first storage node 112 obtains the updated first data block D11" is described below in detail using an example in which the log chain of the first data block D11 in the first stripe S1 is stored in the PCM of the first storage node 112. FIG. 7 shows a data merging method according to an embodiment of the present invention. It may be understood that for each data block with a log chain, a merging operation can be performed according to the method shown in FIG. 7, to obtain an updated data block. For ease of description, the log chain of the first data block D11 in the stripe 1 (S1) is still used as an example for description.

In step 702, the first storage node 112 determines valid data in the log chain of the first data block D11. In this embodiment of the present invention, the valid data is latest updated data of the first data block D11. Specifically, the first storage node 112 may determine the valid data in the log chain of the first data block D11 based on information about an update data chunk recorded in at least one data node in the log chain of the first data block D11. The first storage node 112 may determine the valid data in the log chain based on an update sequence of data nodes in the log chain of the first data block D11 and based on block location information of the update data chunk. The data nodes in the log chain are sequentially obtained based on a sequence of modification time of the first data block D11. In this manner, an obtaining time of a data node at an end of the log chain is later than an obtaining time of a data node at a header of the log chain. A block location of the update data chunk may be obtained based on information about "block offset" and "log data chunk length" fields in a data node.

In a specific data merging process, there may be the following two cases. In a first case, block locations of update data chunks recorded in the data nodes in the log chain do not overlap. In this case, the first storage node 112 may determine that the update data chunks recorded in the data nodes in the log chain are valid data. The log chain of the first data block D11 shown in FIG. 5 is used as an example. As shown in FIG. 5, the log chain of the first data block D11 has two data nodes: the first data node 506 and the second data node 508, and a generation time of the second data node 508 is later than that of the first data node 506. If a block location of an update data chunk in the first data node 506 is the $0.2^{nd}$ M to $0.5^{th}$ M bytes, and a page location of an update data chunk in the second data node 508 is the $0.8^{th}$ M to $0.9^{th}$ M bytes, the first storage node 112 determines that both the update data chunk recorded in the first data node and the update data chunk recorded in the second data node are valid data.

In a second case, block locations of update data chunks in the data nodes in the log chain overlap. In this case, for at least two update data chunks that have an overlapping block location, the first storage node 112 determines that data located at the overlapping location and recorded in a data node generated later in the log chain is valid data. In addition, the first storage node 112 determines that data at non-overlapping locations and in the at least two update data chunks having the overlapping block location is valid data. That is, when there is the overlapping block location, the first storage node 112 determines that all data in the data node generated later and data at a non-overlapping location of a data node generated earlier are valid data. For example, the log chain of the first data block D11 in FIG. 5 is used as an example. If the block location of the update data chunk recorded in the first data node 506 is the $0.2^{nd}$ M to $0.5^{th}$ M bytes, and the block location of the update data chunk recorded in the second data node 508 is the $0.4^{th}$ M to $0.7^{th}$ M bytes, the first storage node 112 determines that data from the $0.2^{nd}$ M to $0.4^{th}$ M bytes recorded in the first data node and data from the $0.4^{th}$ M to $0.7^{th}$ M bytes in the second data node are valid data.

In step 704, the first storage node 112 obtains the first data block D11 in the stripe 1 (S1) from the magnetic disk. It may be understood that the first data block D11 that is in the stripe 1 and that is stored in the magnetic disk of the first storage node 112 is a data block that is not updated. In step 706, the first storage node 112 updates the valid data to the first data block D11, to obtain the updated first data block D11". It may be understood that the update data chunk recorded in the log chain of the first data block is data obtained after at least some data of the first data block D11 in the stripe 1 is updated in a plurality of update processes. To obtain the updated first data block, the update data chunk recorded in the log chain needs to be updated to the first data block D11 stored in the magnetic disk, to obtain the updated first data block D11". Specifically, the first storage node 112 may use the valid data that is in the log chain and that is determined in step 702 to replace data that is in the first data block D11 and whose block location is the same as that of the valid data. For example, if in step 702, the first storage node 112 determines that the block location of the valid data in the log chain of the first data block D11 is the $0.2^{nd}$ M to $0.4^{th}$ M bytes, the first storage node 112 may replace data from the $0.2^{nd}$ M to $0.4^{th}$ M bytes in the first data block D11 with the determined valid data in the log chain from the $0.2^{nd}$ M to $0.4^{th}$ M bytes, so as to obtain the updated first data block D11".

After the updated first data block D11" is obtained, in step 616, the first storage node 112 returns the updated first data block D11" to the management node 110. Likewise, the second storage node 114 may obtain the updated second data block D12" using a method similar to that used by the first storage node 112; and in step 618, the second storage node 114 returns the obtained updated second data block D12" to the management node 110. The third storage node 116 may obtain the updated third data block D13" using a method similar to that used by the first storage node 112 to obtain the update data chunk; and in step 620, the third storage node 116 returns the obtained updated third data block D13" to the management node 110.

After the management node 110 receives the update data chunks (for example, the foregoing first data block D11", second data block D12", and third data block D13") returned by the storage nodes, in step 622, the management node 110 may obtain an updated parity block P1' through calculation based on the received updated data blocks in the first stripe. When calculating the parity block, the management node 110 may obtain the updated parity block based on a preset EC algorithm and the data blocks. It may be understood that, in actual application, there may be a plurality of parity blocks. For ease of description, one parity block is used as an example for description in this embodiment of the present invention.

After obtaining the updated parity block, the management node 110 sends update requests to the storage nodes, to store the updated data blocks and the updated parity block in the first stripe into the storage nodes. Specifically, in step 624, the management node 110 may send a third update request to the first storage node 112, where the third update request is used to instruct the first storage node 112 to store the updated first data block D11". In step 626, the management node 110 may send a fourth update request to the second storage node 114, where the fourth update request is used to instruct the second storage node 114 to store the updated second data block D12". In step 628, the management node 110 may send a fifth update request to the third storage node 116, where the fifth update request is used to instruct the third storage node 116 to store the updated third data block D13". In step 630, the management node 110 may send a sixth update request to the fourth storage node 118, where the sixth update request is used to instruct the fourth storage node 118 to store the updated parity block P1'.

In step 632, the first storage node 112 stores the updated first data block D11" into the magnetic disk of the first storage node 112. In step 634, the second storage node 114 stores the updated second data block D12" into a magnetic disk of the second storage node 114. In step 636, the third storage node 116 stores the updated third data block D13" into a magnetic disk of the third storage node 116. In step 638, the fourth storage node 118 stores the updated parity block P1' into a magnetic disk of the fourth storage node 118. How the storage nodes store the updated data blocks is briefly described below using an example in which the first storage node 112 stores the updated first data block D11".

In this embodiment of the present invention, each update request also carries an updated data block and information about the updated data block. Specifically, the information about the updated data block may include a stripe ID, a block ID, a block length, a block offset, and stripe integrity information. For example, the third update request may carry the updated first data block D11", the stripe ID of the first stripe, a block ID of the updated first data block D11", a length of the updated first data block D11", a block offset, and integrity information of an updated first stripe. It may be understood that after obtaining the updated data blocks from the storage nodes and calculating the updated parity block, the management node may obtain the updated first stripe S1". The updated first stripe S1" is a complete stripe. The updated first stripe S1" includes the updated first data block D11", the updated second data block D12", the updated third data block D13", and the updated parity block P1'. In the third update request, the integrity information of the first stripe is used to indicate that the updated first stripe S1" to which the updated first data block D11" that is to be written belongs is a complete stripe.

After the first storage node 112 receives the third update request, the first storage node 112 may determine, based on the integrity information of the updated first stripe S1", that the updated first stripe S1" to which the updated first data block D11" belongs is a complete stripe, and the first storage node 112 writes the updated first data block D11" carried in the third update request into a corresponding location in the magnetic disk, thereby updating the first data block D11 in the first stripe. Likewise, the second storage node 114 can store the updated second data block D12" into the magnetic disk of the second storage node 114, the third storage node 116 can store the updated third data block D13" into the magnetic disk of the third storage node 116, and the fourth storage node 118 can store the updated parity block P1' into the magnetic disk of the fourth storage node 118.

After the data blocks and the parity block in the updated first stripe S1" are separately stored into the storage nodes in the storage system 100, the storage nodes may delete log chains of the corresponding data blocks. For example, the first storage node 112 may delete the log chain of the first data block D11 in the first stripe S1, to release storage space occupied by the log chain of the first data block D11. After a storage node deletes a log chain of a data block stored in a PCM of the storage node, a storage node that backs up the log chain of the data block also needs to delete a backup log chain in a PCM of the storage node. For example, if the second storage node 114 stores a backup log chain of the first data block D11, the first storage node 112 needs to instruct the second storage node 114 to delete the backup log chain of the first data block D11.

It should be noted that step 602 of the method shown in FIG. 6 is not mandatory. In actual application, to release the storage space, the update data chunk recorded in the PCM may be flushed to the magnetic disk based on a specified time. When the specified time expires, the management node 110 performs a data flushing operation. In this manner, when the specified time expires, the management node 110 may separately read data blocks in a stripe from the plurality of storage nodes, calculate a parity block, and then separately write updated data blocks and an updated parity block into the plurality of storage nodes. For details, refer to descriptions in the foregoing step 604 to step 638.

In this embodiment of the present invention, because the update data chunk recorded in the log chain is not updated data at a granularity of a data block in the stripe, the data updating method of the present invention can support fine-grained updating of the stripe. In addition, when a partial update is performed on the stripe, the update data chunk is not directly updated to the magnetic disk in a RAID manner.

Instead, the update data chunk is written into the PCM of the storage node. The update data chunk recorded in the PCM 125 is updated to a corresponding data block in the stripe only when a particular condition is met, the updated parity block is obtained based on the updated data block, and the updated data block and the updated parity block are written into the magnetic disks of the storage nodes. According to the data updating method provided in this embodiment of the present invention, after the data is written into the PCM, the write success message may be returned to the management node 110, so that processing efficiency of the storage system can be improved. In addition, in the manner shown in FIG. 6, update data chunks in a plurality of modification processes are postponed for merging, and then flushed to the magnetic disks of the storage nodes. In comparison with an existing stripe updating method, this can reduce write amplification problems of the storage system.

In this embodiment of the present invention, even if a storage node becomes faulty and is restarted, data can still be written back and recovered based on the log chains in the PCMs of the storage nodes. This ensures that no newly written data is lost and ensures data security. Specifically, if a storage node becomes faulty and is restarted, the management node 110 may recover, based on a data block and a parity block in a stripe that are stored in another storage node, the data block that is in the stripe and that is stored in the storage node, and update the recovered data block based on an update data chunk recorded in a log chain in a PCM of the storage node or based on backup data of the update data chunk recorded in a backup log chain, so that an updated data block can be obtained.

For example, if the first storage node 112 becomes faulty, and the first data block D11 in the first stripe needs to be recovered, the management node 110 may recover the first data block D11 in the first stripe using the data block D12 stored in the second storage node 114, the data block D13 stored in the third storage node 116, and the parity block P1 stored in the fourth storage node 118. Then, the recovered first data block D11 is merged based on the update data chunk D11' recorded in the log chain in the PCM of the first storage node 112 and in the manner shown in FIG. 7, so that the updated first data block D11" can be obtained.

It may be understood that, in another case, after the recovered first data block D11 is obtained, the recovered first data block D11 may be merged based on backup data of the update data chunk D11' recorded in the backup log chain of the first data block in the second storage node 114 and in the manner shown in FIG. 7, to obtain the updated first data block D11".

It can be learned from the data recovery method provided in this embodiment of the present invention that, although in this embodiment of the present invention, some update data chunks in a stripe are not directly updated in the RAID manner, a log chain manner is used to record the update data chunks in PCMs, and a multi-copy manner is further used to back up the update data chunks in this embodiment of the present invention. In this way, even if a storage node becomes faulty before the update data chunks are flushed to magnetic disks, data stored in the faulty storage node can still be recovered and updated using data and a log chain that are stored in another storage node or the update data chunks recorded in a backup log chain, thereby ensuring data security.

Figure 8:
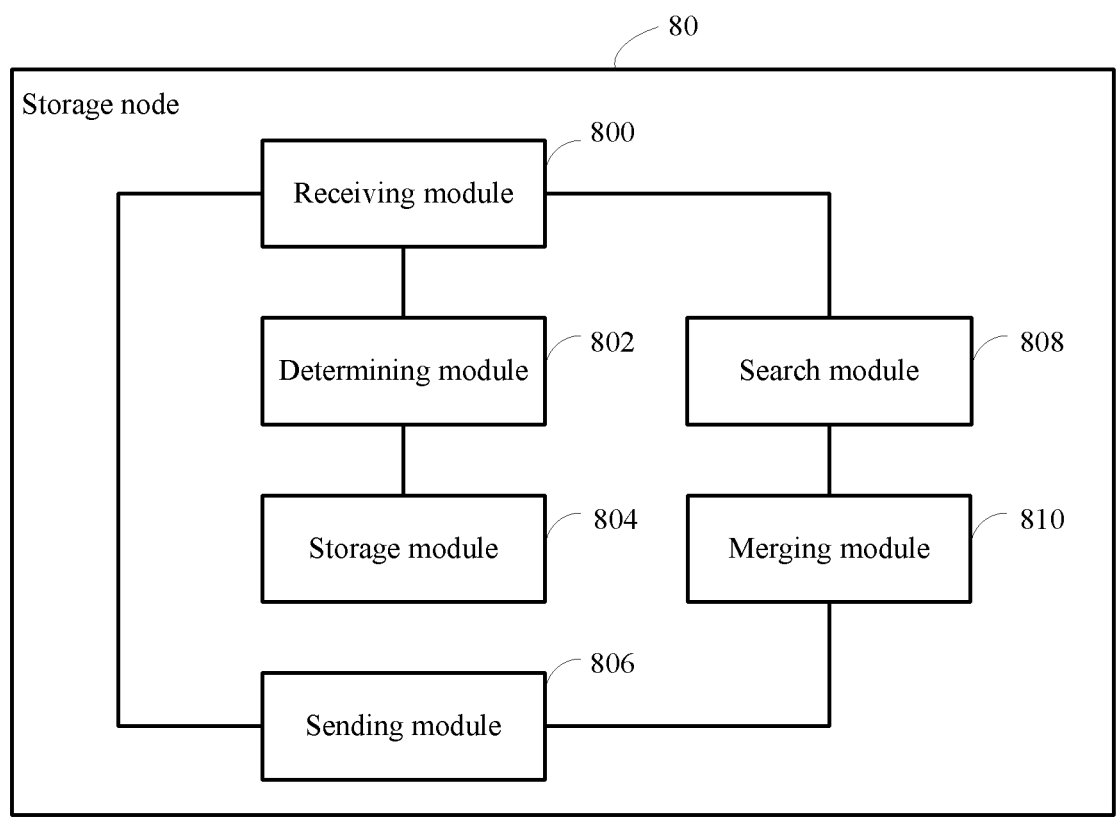
FIG. 8 is a schematic structural diagram of another storage node according to an embodiment of the present invention.

FIG. 8 is a schematic structural diagram of another storage node according to an embodiment of the present invention. The storage node shown in FIG. 8 may be used as a storage node in the storage system shown in FIG. 1. For example, the storage node shown in FIG. 8 may be used as the storage node 112, 114, 116, or 118 shown in FIG. 1. The storage node shown in FIG. 8 is used as any one of the plurality of storage nodes shown in FIG. 1. For ease of description, the storage node shown in FIG. 8 is referred to as a first storage node. As shown in FIG. 1, the storage system includes a management node and a plurality of storage nodes. The plurality of storage nodes form a redundant array of independent disks RAID. As shown in FIG. 8, the storage node 80 may include the following modules:

a receiving module 800, configured to receive an update request sent by the management node, where the update request carries a first update data chunk in a first update stripe and integrity information of the first update stripe, the first update data chunk is used to update a data of a first data block in a first stripe in the RAID, and the first stripe includes data blocks and a parity block that are separately stored in the plurality of storage nodes;

a determining module 802, configured to determine, based on the integrity information of the first update stripe, that the first update stripe is an incomplete stripe; and a storage module 804, configured to insert a data node into a log chain of the first data block, where information about the first update data chunk is recorded in the inserted data node, the log chain of the first data block is stored in a non-volatile memory NVM of the first storage node, information about updated data of the first data block in at least one update process is recorded in the log chain of the first data block, and the information about the first update data chunk includes the first update data chunk or a storage address of the first update data chunk in the NVM of the first storage node.

In actual application, the storage module 804 may specifically insert the data node at an end or a header of the log chain of the first data block. After the data node is inserted, the log chain of the first data block includes at least two data nodes that are sequentially linked based on an update sequence of the first data block.

In another case, the storage node 80 may further include a sending module 806. The sending module 806 is configured to send a backup request to a second storage node. The backup request carries the first update data chunk, and the backup request is used to instruct the second storage node to back up the first update data chunk. Specifically, the second storage node may insert a new data node into a backup log chain of the first data block based on the backup request. The inserted data node includes backup information of the first update data chunk, the backup information of the first update data chunk includes the first update data chunk or a storage address of the first update data chunk in an NVM of the second storage node, and the backup log chain of the first data block is stored in the NVM of the second storage node. In this embodiment of the present invention, the backup log chain is used to back up the update data chunk in the log chain of the first data block.

In another case, the receiving module 800 is further configured to receive a read request sent by the management node, where the read request carries an identifier of the first stripe and an identifier of the first data block. The storage node 80 may further include a search module 808 and a merging module 810. The search module 808 is configured to determine, based on the identifier of the first stripe and the identifier of the first data block, that the log chain of the first data block is stored in the NVM of the first storage node. The merging module 810 is configured to obtain an updated first data block based on information about at least one update data chunk recorded in the log chain of the first data block and the first data block stored in the first storage node. The sending module 806 is further configured to return the updated first data block to the management node.

In actual application, the merging module 810 is specifically configured to: determine valid data in the log chain of the first data block based on the information about the at least one update data chunk recorded in the log chain of the first data block, and merge the valid data into the first data block, to obtain the updated first data block. The valid data is latest modified data of the first data block, and the first data block is read from an external storage device of the first storage node.

In this embodiment of the present invention, the log chain of the first data block may further include an offset of the first update data chunk in the first data block, a length of the first update data chunk, and address information of an adjacent data node of the inserted data node. For detailed descriptions of the log chain and the information about the update data chunk recorded in the log chain, refer to the foregoing embodiments.

The storage node 80 provided in this embodiment of the present invention may perform the data updating method described in the foregoing embodiments. Specifically, for detailed descriptions of functions of modules, refer to related descriptions of a storage node in the foregoing embodiments (for example, the embodiments shown in FIG. 4 to FIG. 7). Details are not described herein again.

An embodiment of the present invention further provides a computer program product for a data updating method, including a computer readable storage medium storing program code. An instruction included in the program code is used to perform the method procedure described in any one of the foregoing method embodiments. A person of ordinary skill in the art may understand that the foregoing storage medium may include any non-transitory (non-transitory) machine-readable medium capable of storing program code, such as a USB flash drive, a removable hard disk, a magnetic disk, an optical disc, a random-access memory (Random-Access Memory, RAM), a solid state drive (Solid state drive, SSD), or another non-volatile memory (non-volatile memory).

It should be noted that the embodiments provided in this application are merely examples. A person skilled in the art may clearly know that, for convenience and conciseness of description, in the foregoing embodiments, the embodiments emphasize different aspects, and for a part not described in detail in an embodiment, reference may be made to relevant description of another embodiment. Features disclosed in the embodiments of the present invention, claims, and the accompanying drawings may exist independently, or exist in a combination. Features described in a hardware form in the embodiments of the present invention may be executed by software, and vice versa, which is not limited herein.

What is claimed is:

1. A data updating method performed in a storage system having a plurality of storage nodes forming a redundant array of independent disks (RAID), comprising:
receiving, by a management node of the storage system, a write request carrying to-be-written data, wherein a size of the to-be-written data is smaller than a stripe size of the RAID;
obtaining, by the management node, an update data chunk from the to-be-written data;
sending, by the management node to a first storage node in the plurality of storage nodes, a first update request for updating a first data block of a stripe in the RAID, the first data block being stored in the first storage node, the first update request comprising the update data chunk and an update indicator having a first value selected according to the size of the to-be-written data being smaller than the stripe size; and in response to the update indicator in the first update request, storing, by the first storage node, the update data chunk into a non-volatile memory (NVM) cache of the first storage node, wherein the NVM cache of the first storage node contains data representing a log chain of the first data block, the log chain comprises data nodes, each data node constraining information regarding a data chunk to be written into the first data block.

2. The data updating method of claim 1, further comprising:

sending, by the first storage node to a second storage node in the plurality of storage nodes, a backup request carrying the update data chunk for storing in the second storage node as a backup.

3. The data updating method of claim 1, wherein each data node contains information regarding a data chunk to be written into the first data block in a corresponding data write event performed on the first data block, and wherein the step of storing the update data chunk into the NVM cache of the first storage node comprises:

inserting a new data node into the log chain of the first data block, the new data node comprising information regarding the update data chunk, wherein the information regarding the update data chunk comprises the update data chunk or a storage address of the update data chunk in the NVM cache.

4. The data updating method of claim 3, wherein inserting the new data node into the log chain of the first data block comprises:

adding the new data node at an end or a head of the log chain, wherein the data nodes in the log chain are arranged in a sequential order according to a time sequence of corresponding data write events.

5. The data updating method of claim 3, further comprising:

sending, by the management node to the plurality of storage nodes, a read request for reading data blocks in the stripe;

obtaining, by the first storage node, an updated first data block based on information regarding update data chunks in the log chain and the first data block stored in the first storage node;

sending, by each of the plurality of storage nodes to the management node, a corresponding data block in the stripe, including the first storage node sending the updated first data block as the first data block to the management node;

receiving, by the management node, data blocks in the stripe sent by the plurality of storage nodes;

calculating, by the management node, an updated parity block based on the data blocks sent by the plurality of storage nodes; and storing, by the management node, the updated parity block into a storage node storing a parity block of the stripe.

6. The data updating method of claim 5, further comprising:

sending, by the management node to the first storage node, a second update request for updating the first data block of the stripe, the second update request comprising an update indicator having a second value for instructing to store the updated first data block into the first storage node; and in response to the update indicator in the second update request, storing, by the first storage node, the updated first data block into storage space for the first data block in the first storage node.

7. The data updating method of claim 6, further comprising:

releasing, by the first storage node, storage space occupied by the log chain of the first data block after storing the updated first data block into the storage space for the first data block.

8. A data updating method performed by a first storage node of a storage system having a management node and a plurality of storage nodes forming a redundant array of independent disks (RAID), comprising:

receiving from the management node a first update request for updating a first data block of a stripe in the RAID, the first data block being stored in the first storage node, the first update request comprising an update data chunk and an update indicator having a first value indicating that the update data chunk is to be cached by the first storage node; and storing the update data chunk into a non-volatile memory (NVM) cache of the first storage node in response to the update indicator in the first update request, wherein the NVM cache contains data representing a log chain of the first data block, and the log chain comprises data nodes each containing information regarding a data chunk to be written into the first data block.

9. The data updating method of claim 8, further comprising:

sending a backup request to a second storage node in the plurality of storage nodes, the backup request carrying the update data chunk for storing in the second storage node as a backup.

10. The data updating method of claim 8, wherein each data node contains information regarding a data chunk to be written into the first data block in a corresponding data write event performed on the first data block; and wherein the step of storing the update data chunk into the NVM cache of the first storage node comprises:

inserting a new data node into the log chain of the first data block, the new data node comprising information regarding the update data chunk, wherein the information regarding the update data chunk comprises the update data chunk or a storage address of the update data chunk in the NVM cache.

11. The data updating method of claim 10, wherein the step of inserting the new data node into the log chain of the first data block comprises adding the new data node at an end or a head of the log chain, the data nodes in the log chain being arranged in a sequential order according to a time sequence of corresponding data write events.

12. The data updating method of claim 10, further comprising:

receiving from the management node a read request carrying an identifier of the stripe and an identifier of the first data block;

determining, based on the identifier of the stripe and the identifier of the first data block, that the log chain of the first data block is stored in the NVM cache of the first storage node;

obtaining an updated first data block based on information regarding data chunks in the data nodes of the log chain and the first data block stored in the first storage node; and sending the updated first data block to the management node.

13. The data updating method of claim 12, further comprising:

receiving from the management node a second update request for updating the first data block of the stripe, the second update request comprising an update indicator having a second value for instructing to store the updated first data block into the first storage node; and in response to the update indicator in the second update request, storing the updated first data block into storage space for the first data block in the first storage node.

14. The data updating method of claim 13, further comprising:

releasing storage space occupied by the log chain of the first data block after storing the updated first data block into the storage space for the first data block.

15. The data updating method of claim 10, wherein the information regarding the data chunk of said each data node in the log chain further comprises: an offset of the data chunk in the first data block, a length of the data chunk, and address information of an adjacent data node of said each data node.

16. A storage system, comprising:

a plurality of storage nodes forming a redundant array of independent disks (RAID), the plurality of storage nodes including a first storage node;

a management node coupled to the plurality of storage nodes and configured to:

receive a write request carrying to-be-written data, wherein a size of the to-be-written data is smaller than a stripe size of the RAID;

obtain an update data chunk from the to-be-written data;

send, to the first storage node in the plurality of storage nodes, a first update request for updating a first data block of a stripe in the RAID, the first data block being stored in the first storage node, the first update request comprising the update data chunk and an update indicator having a first value selected according to the size of the to-be-written data being smaller than the stripe size; and the first storage node being configured to store the update data chunk into a non-volatile memory (NVM) cache of the first storage node in response to the update indicator in the first update request, wherein the NVM cache contains data representing a log chain of the first data block, and the log chain comprises data nodes each containing information regarding a data chunk to be written into the first data block.

17. The storage system of claim 16, wherein the first storage node is further configured to send a backup request to a second storage node in the plurality of storage nodes, the backup request carrying the update data chunk for storing in the second storage node as a backup.

18. The storage system of claim 16, wherein each data node contains information regarding a data chunk to be written into the first data block in a corresponding data write event performed on the first data block, and wherein the first storage node is configured to insert a new data node into the log chain of the first data block, the new data node comprising information regarding the update data chunk, wherein the information regarding the update data chunk comprises the update data chunk or a storage address of the update data chunk in the NVM cache.

19. The storage system of claim 18, wherein the first storage node is configured to add the new data node at an end or a head of the log chain, wherein the data nodes in the log chain are arranged in a sequential order according to a time sequence of corresponding data write events.

20. The storage system of claim 18, wherein the management node is further configured to send to the plurality of storage nodes a read request for reading data blocks in the stripe; and the first storage node is further configured to:

in response to the read request, obtain an updated first data block based on information regarding update data chunks in the log chain and the first data block stored in the first storage node; and send the updated first data block as data of the first data block to the management node.

* * * * *

UNITED STATES PATENT AND TRADEMARK OFFICE
CERTIFICATE OF CORRECTION

PATENT NO. : 11,422,703 B2
APPLICATION NO. : 16/937946
DATED : August 23, 2022
INVENTOR(S) : Qun Yu Page 1 of 1

It is certified that error appears in the above-identified patent and that said Letters Patent is hereby corrected as shown below:

In the Claims

Claim 1, Column 29, Lines 12 and 13, replace "constraining" with "containing".

Signed and Sealed this
Thirteenth Day of September, 2022

Katherine Kelly Vidal
*Director of the United States Patent and Trademark Office*